(12) United States Patent
Horita et al.

(10) Patent No.: US 8,189,233 B2
(45) Date of Patent: May 29, 2012

(54) DENSITY CALCULATING APPARATUS, DENSITY SETTING APPARATUS, DENSITY CALCULATING PROGRAM STORAGE MEDIUM, AND DENSITY SETTING PROGRAM STORAGE MEDIUM

(75) Inventors: Shuhei Horita, Ashigarakami-gun (JP); Takahiro Mishima, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 866 days.

(21) Appl. No.: 12/256,003

(22) Filed: Oct. 22, 2008

(65) Prior Publication Data

US 2009/0103122 A1   Apr. 23, 2009

(30) Foreign Application Priority Data

Oct. 23, 2007   (JP) ................................. 2007-275594
Sep. 30, 2008   (JP) ................................. 2008-254406

(51) Int. Cl.
*G06F 15/00*   (2006.01)
*G06K 15/00*   (2006.01)
*G06K 9/00*   (2006.01)

(52) U.S. Cl. .......................... 358/1.9; 358/2.1; 382/167

(58) Field of Classification Search .................. None
See application file for complete search history.

(56) References Cited

U.S. PATENT DOCUMENTS

| 6,205,246 B1* | 3/2001 | Usami .......................... 382/167 |
| 7,869,089 B2* | 1/2011 | Horita ............................ 358/1.9 |
| 2003/0053085 A1* | 3/2003 | Takemoto ...................... 358/1.9 |
| 2003/0156299 A1* | 8/2003 | Martinez et al. ............... 358/1.9 |
| 2006/0092442 A1* | 5/2006 | Such et al. ..................... 358/1.9 |
| 2007/0013964 A1* | 1/2007 | Ono ............................. 358/406 |
| 2007/0139678 A1* | 6/2007 | Horita ........................... 358/1.9 |
| 2008/0062193 A1* | 3/2008 | Olson ........................... 345/591 |
| 2009/0116048 A1* | 5/2009 | Usami .......................... 358/1.9 |

FOREIGN PATENT DOCUMENTS

| JP | 2001-347645 A | 12/2001 |
| JP | 2004-106523 A | 4/2004 |

* cited by examiner

*Primary Examiner* — Twyler Haskins
*Assistant Examiner* — Barbara Reinier
(74) *Attorney, Agent, or Firm* — Sughrue Mion, PLLC

(57) ABSTRACT

A density calculating apparatus includes: an image data acquisition section that acquires print image data representing a print image; a place designating section that designates a place on the print image; and a target color acquisition section that acquires a target color of a color of the place. The apparatus further includes: a color guess section that guesses a print color of the place to be printed by a printing system, by using a patch image produced based on a predetermined criterion; and a density calculation section that calculates the print densities of the color materials having the multiple colors by using the color guess section so that the target color is achieved at the place by the printing system based on the print image data.

16 Claims, 15 Drawing Sheets

DENSITY CALCULATING APPARATUS, DENSITY SETTING APPARATUS, DENSITY CALCULATING PROGRAM STORAGE MEDIUM, AND DENSITY SETTING PROGRAM STORAGE MEDIUM

BACKGROUND OF THE INVENTION

1. Field of the Invention

The present invention relates to a density calculating apparatus that calculates a print density of a color material when an image is printed in a printing system, a density calculating program storage medium, a density setting apparatus that sets the print density of the color material, and a density setting program storage medium.

2. Description of the Related Art

Conventionally, in a printing field, a print image has been formed by a series of processing where an image is edited by a personal computer and the like, a film original plate is made on the basis of the edited image, a plate is made on the basis of the film original plate, the plate is mounted on a printing machine and inks are applied thereto, and the applied inks are transferred onto a paper sheet. Further, in recent years, a CTP (Computer To Plate), which directly forms an image on a plate, is provided in a printing machine, and an automated digital printing machine, which can perform a plate making process and the like for acquiring a skilled technique, has been developed. Accordingly, the printing machine has been demanded as a printing machine for small quantity batch production that makes small quantity and various kinds of printed matters.

Meanwhile, a series of operations for performing printing on a paper sheet are massive operations of which a printing unit corresponds to several hundred copies, and large processing time or cost are required. Accordingly, before the actual printing operation, a proof image where a print image is reproduced is formed by a printer or the like more convenient than the printing machine, and the finishing of the print image is previously conformed by using the proof image. In addition, in the recent years, a proof image has been displayed on a calibrated monitor. Accordingly, it is possible to efficiently reduce the waste of a paper sheet, and to simply confirm an image of a print image in printing processes.

However, in the prior confirmation using the proof image, it is possible to confirm the design or the entire image of the print image. However, the color of the print image including the thickness of inks or the like or the finishing of the print image is confirmed by printing an image with the printing machine. In actual fact, the preferred thickness of inks varies depending on the print media, such as a newspaper, an advertising matter, a poster, and a magazine. Accordingly, when the print image is made, a user manually adjusts the print density of the inks of the printing machine until a desired color is obtained while the printing machine is driven and test printing is repeated. For this reason, there is a problem in that a large number of waste sheets are generated. Further, the number of waste sheets generated until the final print density of the inks is determined is substantially constant regardless of print copies. Accordingly, as the print copies are small, a ratio of the waste sheets is increased. Therefore, as for the digital printing machine for small quantity batch production, in order to reduce cost, it is important to shorten the time required until the print density of the inks is determined, and to suppress the generation of waste sheets.

In regard to this point, Japanese Patent Application Publication No. 2001-347645 discloses a technique where a forecast image in which a print image is forecasted is formed on the basis of an opening degree value of an ink key that is used to adjust the print density of an ink and a pixel value of image data, and a user manually adjusts the print density of the ink while referring to the forecast image. Japanese Patent Application Publication No. 2004-106523 discloses a technique where the print density of an ink is automatically adjusted by setting a color of color samples printed by a reference printing machine of which color is adjusted as a target color so that a color of the print image to be printed by a print machine required of color adjustment approaches the target color. In the technique disclosed in Japanese Patent Application Publication No. 2001-347645, since the color of the print image can be broadly conformed before printing, it is possible to shorten the processing time required until the print density of the ink is determined. In the technique disclosed in Japanese Patent Application Publication No. 2004-106523, it is possible to easily adjust the print density of the ink so that the color of a printed matter of the reference printing machine is reproduced by another printing machine.

However, in the technique disclosed in Japanese Patent Application Publication No. 2001-347645, in order to improve the forecast accuracy of a print image, the opening degree value of the ink key does need to minutely correspond to the pixel value of the image data, and the amount of data becomes huge. Further, it is possible to confirm the forecast image of the print image. However, an operation for finding out the print density of the ink required to correct the color of the forecast image into a desired color requires a skilled technique, and there is a problem in that it is difficult for an inexperienced user to adjust the print density of the ink.

Furthermore, in the technique disclosed in Japanese Patent Application Publication No. 2004-106523, until a color reproduction feature of the reference printing machine is achieved by the print machine required of color adjustment, the print density of color materials of the print image is finely adjusted while test printing is actually performed. Therefore, if an ink of which the initial state is not optimally set, much time is required until the print density of the ink is stabilized. For this reason, there is a problem in that a large number of waste sheets are generated.

SUMMARY OF THE INVENTION

The present invention has been made in view of the above circumstances and provides a density calculating apparatus, a density setting apparatus, a density calculating program storage medium, and a density setting program storage medium that can suppress the generation of waste sheets and adjust the print density of a color material easily without requiring a skilled technique.

A density calculating apparatus according to the present invention includes:

an image data acquisition section that acquires print image data representing a print image to be printed by a first printing system, the first printing system setting print densities of color materials having multiple colors and printing an image based on the image data by using the color materials in the print densities;

a density acquisition section that acquires the print densities in a second printing system different from the first printing system, the second printing system setting print densities of the color materials having the multiple colors and printing an image based on the image data by using the color materials in the print densities;

a place designating section that designates a place on the print image represented by the print image data acquired by the image data acquisition section;

a first color guess section that guesses a print color to be printed by the first printing system on the basis of the print densities of the color materials having the multiple colors and the image data; a second color guess section that guesses a print color to be printed by the second printing system on the basis of the print densities of the color materials having the multiple colors and the image data;

a target color acquisition section that acquires a print color of the place designated by the place designating section as a target color of the place in the first printing system, by providing the print image data acquired by the image data acquisition section and the print densities acquired by the density acquisition section to the second color guess section; and a density calculation section that calculates the print densities of the color materials having the multiple colors by using the first color guess section so that the target color acquired by the target color acquisition section is achieved at the place by the first printing system based on the print image data.

In this case, a "place" in the present invention may be one point, a region, or a point group including several points.

Further, the print density of the color material in the present invention indicates the density of the print image that is set by adjusting the amount of a supplied color material through the opening and closing of an ink key.

According to the density calculation apparatus of the present invention, based on print image data and each of print densities of multiple color materials which are set in the second printing system, a print color of a place specified on the print image in the second printing system is estimated and acquired as a target color, and each print density of the multiple color materials is calculated so that the target color is realized at the specified place on the print image to be output in the first printing system. Therefore, without skilled techniques, by setting a print density of a color material, a print color of the second printing system can be reproduced in the first printing system. Further, by finely adjusting each print density of multiple color materials so that a target color is realized at a specified place on a print image while actually printing the print image in the first printing system by setting a calculated print density of a color material to the initial value, it is possible to accurately realize color reproducibility characteristics of the second printing system in the first printing system and to reduce a time required up to the stabilization of the print densities of color materials and thus suppress waste sheets. Further, by transmitting a print density of the second printing system over the Internet line etc., the density calculation apparatus of the present invention can obtain a target color for a desired color, thereby a print color employed in the second printing system can be also employed in any other printing systems even if there is no actual color samples printed in the second printing system.

In the density calculating apparatus of the present invention, it is preferable that the place designating section designates multiple places as the place while giving different priority orders to the places, the target color acquisition section acquires target colors of the multiple places, and the density calculation section calculates common print densities where the target colors of the multiple places are achieved by the printing system, while emphasizing the achievement accuracy of the place, which has a relatively high priority order, of the multiple places as compared to the achievement accuracy of the place that has a relatively low priority order.

Generally, in many cases, the printing system represents colors by the combination of print densities of four color materials of C, M, Y, and K colors. However, it is difficult to realize each target color of multiple places only with the combination of the print densities of these four color materials. According to the preferred density calculation apparatus, realization accuracy at a place having a higher priority is calculated preferentially than a place having a relatively lower priority, so that it is possible to realize an important color, such as a company logo color with high accuracy.

In the density calculating apparatus of the present invention, it is preferable that the place designating section displays the print image on the basis of the print image data, and designates the place according to a selection operation for selecting the place on the displayed print image.

A user can easily designate a place, which achieves the target color easily, only by selecting an important color on the displayed print image.

In the density calculating apparatus of the present invention, it is preferable that the place designating section designates a region on the print image, and the target color acquisition section acquires a target color with respect to a mean color of the region.

Colors, such as a flesh color, a green color, a blue color, and a gray color, are important components that determine the impression of a printed matter, and are handled as important colors in a printing field. According to the density calculating apparatus of the present invention, it is possible to easily obtain a print image, which has good appearance, by broadly designating a region, which includes an important color such as a green color or a flesh color, on the print image.

In the density calculating apparatus of the present invention, it is preferable that the place designating section designates a region on the print image, and the target color acquisition section acquires a target color for a color that most frequently appears in the region.

According to the preferred density calculating apparatus, even though important colors are dispersed on the print image, it is possible to obtain a print image where the important color is achieved by a target color, only by selecting a region including many important colors.

In the density calculating apparatus of the present invention, it is preferable that the print image data is formed of a group of color data that represents colors of points on the print image, and the place designating section designates one or more point groups of which the number is large among point groups including points on the print image where the color data are common, as the place.

According to the preferred density calculating apparatus, it is possible to reduce user's efforts to select an important color, and to form a print image where a color corresponding to high frequency of appearance is represented by the target color.

In the density calculating apparatus of the present invention, it is preferable that the print image data is formed of groups of color data that represents colors of points on the print image, and the place designating section designates each point, of which the color is represented by the same color data as those representing a predetermined important color, on the print image as the place.

It is possible to easily obtain a print image where the important color is represented by the target color, by storing an important color such as a color of a corporate logo in advance.

In the density calculating apparatus of the present invention, it is preferable that the place designating section gives a priority order to the multiple places in descending order of the area of the place.

An important color frequently has a large area on the print image. According to the preferred density calculating apparatus, it is possible to easily obtain a printed matter where the important color is represented by the target color.

In the density calculating apparatus of the present invention, it is preferable that at least either the first color guess section or the second color guess section estimates a print color at the place, on the basis of a corresponding relationship between a color of each patch and a print density as well as on the basis of a tentative print density specified for each of the color materials having multiple colors, the corresponding relationship being obtained by printing a chart image in the second printing system, based on chart image data representing the chart image in which patches of multiple colors are arranged, while changing the print density to a series of print densities for each of the color materials having the multiple colors, such that the estimated print color at the place is obtained based on the print image data and the tentative print density.

The applicant of the present invention proposes a print color forecasting method where the print density of an ink is set to a standard print density of the print image where the print color of the print image becomes a predetermined standard color, and a changed print density where the print density of each of the inks having the multiple colors is changed from the standard print density to an optical density by ±0.1, ±0.2, . . . , when a print image is formed on the basis of print image data where each color dot percentage is 100%, and a print color is forecasted in a desired print density by using the calorimetric result of a patch on each formed chart image. According to the print color forecasting method, it is possible to accurately confirm a color of a print image before the image is actually printed. According to the above preferable density calculating apparatus, the print density of each of the inks having multiple colors is calculated by the inverse operation of the print color forecast method so that a target color is achieved at the designate place on the print image printed by the printing system. Therefore, it is possible to easily set the print density of an ink without requiring a skilled technique.

It is preferable that the density calculating apparatus of the present invention further includes a displaying section that displays a forecast image of a print image to be printed by the first printing system on the basis of the print image data and the print densities of the color materials having the multiple colors, the print densities being calculated by the density calculation section.

Since the forecast image is displayed, it is possible to quantitatively confirm the print density or to confirm the finishing of the print image without actually performing printing.

It is preferable that the density calculating apparatus of the present invention further includes a storage section that stores a reference color of each patch which is obtained by printing the chart image while setting the print density of the first printing system to a standard print density when a print color of an image to be printed on the basis of a predetermined image data becomes a predetermined standard color, as well as stores a corresponding relationship between a color difference and a density difference, the color difference being a difference between the reference color and a color of each patch obtained by printing the chart image while setting the print density of the first printing system to a series of print densities changed from the standard print density for each of the color materials having the multiple colors, and the density difference being a difference between the print density and the standard print density, wherein the first color guess section receives the designation of a tentative print density of each of the color materials having the multiple colors and the place, acquires a relating portion according to the place of the corresponding relationship stored in the storage section, and guesses a print color at the place by performing interpolation processing which uses the reference color of each patch and the relating portion.

For example, when the print densities of the C, M, Y, and K color inks are changed by every 13 steps, 28561 print densities are made through the combination thereof. If the print colors are forecasted for all of them and a corresponding relationship there between is stored, a huge amount of memory capacity is required. According to the preferred density calculating apparatus, the corresponding relationship between the color difference, which is obtained between the reference color of each patch and the reference color of the color of the patch, and the density difference with respect to the standard print density of the print density is stored. Accordingly, only the relating portion corresponding to the designated place is acquired, and the print color of the designate place is guessed while the tentative print density is set. Therefore, it is possible to suppress the increase of the memory capacity and the processing time, thereby guessing the print color.

In the density calculating apparatus of the present invention, it is preferable that the density calculation section uniquely gives a solution x', which satisfies norm minimal solution and a least squares solution, of an exact solution obtained by solving a determinant $Ax=y$ (wherein, A is a matrix, x is a vector representing a density difference, and y is a vector representing a difference of a print color), which is stored in the storage section and corresponds to the corresponding relationship, with respect to x' to a determinant $x'=A'y$; obtains a solution of a density difference by substituting a difference between the target color and the color of the place with y of the determinant $x'=A'y$ by using a generalized inverse matrix A' of the matrix A; repeats the designation of the tentative print density for the first color guess section and the receiving of the print color guessed by the first color guess section with starting from a density, which is deviated from the standard density by the obtained density difference, as the tentative print density; and searches for a print density where the target color is achieved as a print color at the place.

For example, when an image is printed using four C, M, Y, and K color inks, X corresponds to four dimensions. When the measured values $L^*$, $a^*$, and $b^*$ are obtained through the colorimetry of the image by the calorimeter, Y corresponds to three dimensions. Therefore, there is no inverse matrix A− of the matrix A. However, it is possible to uniquely determine an approximate solution x' approaching the exact solution x by giving the condition for satisfying the norm minimal solution and a least squares solution. According to the preferred density calculating apparatus, the print density approaching the print density for achieving the target color is calculated by a generalized inverse matrix, and a print density for achieving the target color is actually searched for with starting from the calculated print density. Therefore, it is possible to reduce a problem corresponding to a local solution, and to quickly calculate the print density.

In the density calculating apparatus of the present invention, it is preferable that when multiple target colors of the multiple places is acquired in the target color acquisition section, the density calculation section makes simultaneous equations by substituting y of determinant x'=A'y with the difference between the color of each place and a target color of the place, a solution of the density difference common to the multiple target colors is obtained by solving the simultaneous equations, and a print density where the multiple target colors is achieved as print colors at the multiple places is searched for with starting from a density, which is deviated from the standard density by the obtained density difference, as the tentative print density.

Simultaneous equations representing a corresponding relationship for each of the several target colors are made and the print density common to the target colors is calculated by a generalized inverse matrix satisfying the simultaneous equations. Accordingly, even if several target colors are set, it is possible to efficiently calculate the print densities that achieve the target colors.

A density setting apparatus of the present invention includes:

an image data acquisition section that acquires print image data representing a print image to be printed by a first printing system, the first printing system setting print densities of color materials having multiple colors and printing an image based on the image data by using the color materials in the print densities;

a density acquisition section that acquires the print densities in a second printing system different from the first printing system, the second printing system setting print densities of color materials having multiple colors and printing an image based on the image data by using the color materials in the print densities;

a place designating section that designates a place on the print image represented by the print image data acquired by the image data acquisition section;

a first color guess section that guesses a print color to be printed by the first printing system on the basis of the print densities of the color materials having the multiple colors and the image data; a second color guess section that guesses a print color to be printed by the second printing system on the basis of the print densities of the color materials having the multiple colors and the image data;

a target color acquisition section that acquires a print color of the place designated by the place designating section as a target color of the place in the first printing system, by providing the print image data acquired by the image data acquisition section and the print densities acquired by the density acquisition section to the second color guess section;

a density calculation section that calculates the print densities of the color materials having the multiple colors by using the first color guess section so that the target color acquired by the target color acquisition section is achieved at the place by the first printing system based on the print image data; and a density setting section that sets the print densities of the color materials having the multiple colors to the first printing system, the print densities being calculated by the density calculation section.

According to the density setting apparatus of the present invention, it is possible to suppress the generation of the waste sheets, and to easily adjust the print density of an ink without requiring a skilled technique.

Meanwhile, as for the density setting apparatus, a basic form has been shown herein, which is merely to avoid the overlapping. The density setting apparatus of the present invention includes not only the basic form but also various embodiments corresponding to the density calculating apparatus.

A density calculating program storage medium of the present invention stores a density calculating program executed in a computer, on the computer, the density calculating program builds:

an image data acquisition section that acquires print image data representing a print image to be printed by a first printing system, the first printing system setting print densities of color materials having multiple colors and printing an image based on the image data by using the color materials in the print densities;

a density acquisition section that acquires the print densities in a second printing system different from the first printing system, the second printing system setting print densities of color materials having multiple colors and printing an image based on the image data by using the color materials in the print densities;

a place designating section that designates a place on the print image represented by the print image data acquired by the image data acquisition section;

a first color guess section that guesses a print color to be printed by the first printing system on the basis of the print densities of the color materials having the multiple colors and the image data; a second color guess section that guesses a print color to be printed by the second printing system on the basis of the print densities of the color materials having the multiple colors and the image data;

a target color acquisition section that acquires a print color of the place designated by the place designating section as a target color of the place in the first printing system, by providing the print image data acquired by the image data acquisition section and the print densities acquired by the density acquisition section to the second color guess section;

a density calculation section that calculates the print densities of the color materials having the multiple colors by using the first color guess section so that the target color acquired by the target color acquisition section is achieved at the place by the first printing system based on the print image data.

Meanwhile, also as for the density calculating program storage medium, a basic form has been shown herein, which is merely to avoid the overlapping. The density calculating program storage medium of the present invention includes not only the basic form but also various embodiments corresponding to the density calculating program storage medium.

In addition, as for a component like the image data acquisition section built on the computer system by the density calculating program of the present invention, one component may be composed of one program product or several components may be composed of one program product. Further, these components may be built by executing itself, or may be built by providing instruction to other programs or program part that includes the components.

A density calculating program storage medium of the present invention stores a density calculating program executed in a computer, on the computer, the density calculating program builds:

an image data acquisition section that acquires print image data representing a print image to be printed by a first printing system, the first printing system setting print densities of color materials having multiple colors and printing an image based on the image data by using the color materials in the print densities;

a density acquisition section that acquires the print densities in a second printing system different from the first printing system, the second printing system setting print densities of color materials having multiple colors and printing an image based on the image data by using the color materials in the print densities;

a place designating section that designates a place on the print image represented by the print image data acquired by the image data acquisition section;

a first color guess section that guesses a print color to be printed by the first printing system on the basis of the print densities of the color materials having the multiple colors and the image data;

a second color guess section that guesses a print color to be printed by the second printing system on the basis of the print densities of the color materials having the multiple colors and the image data; a target color acquisition section that acquires a print color of the place designated by the place designating section as a target color of the place in the first printing system, by providing the print image data acquired by the image data acquisition section and the print densities acquired by the density acquisition section to the second color guess section;

a density calculation section that calculates the print densities of the color materials having the multiple colors by using the first color guess section so that the target color acquired by the target color acquisition section is achieved at the place by the first printing system based on the print image data; and a density setting section that sets the print densities of the color materials having the multiple colors to the first printing system, the print densities being calculated by the density calculation section.

Meanwhile, even as for the density setting program storage medium, a basic form has been shown herein, which is merely to avoid the overlapping. The density setting program storage medium of the present invention includes not only the basic form but also various embodiments corresponding to the density setting program storage medium.

In addition, as for a component such as the image data acquisition section which is built on the computer system by the density setting program of the present invention, one component may be composed of one program product or several components may be composed of one program product. Further, these components may be built by executing itself, or may be built by providing instruction to other programs or program part that includes the components.

According to the present invention, it is possible to suppress the generation of the waste sheets, to easily adjust the print density of an ink without requiring a skilled technique.

DESCRIPTION OF THE PREFERRED EMBODIMENTS

An embodiment of the present invention will be described below with reference to the drawings.

Figure 1:
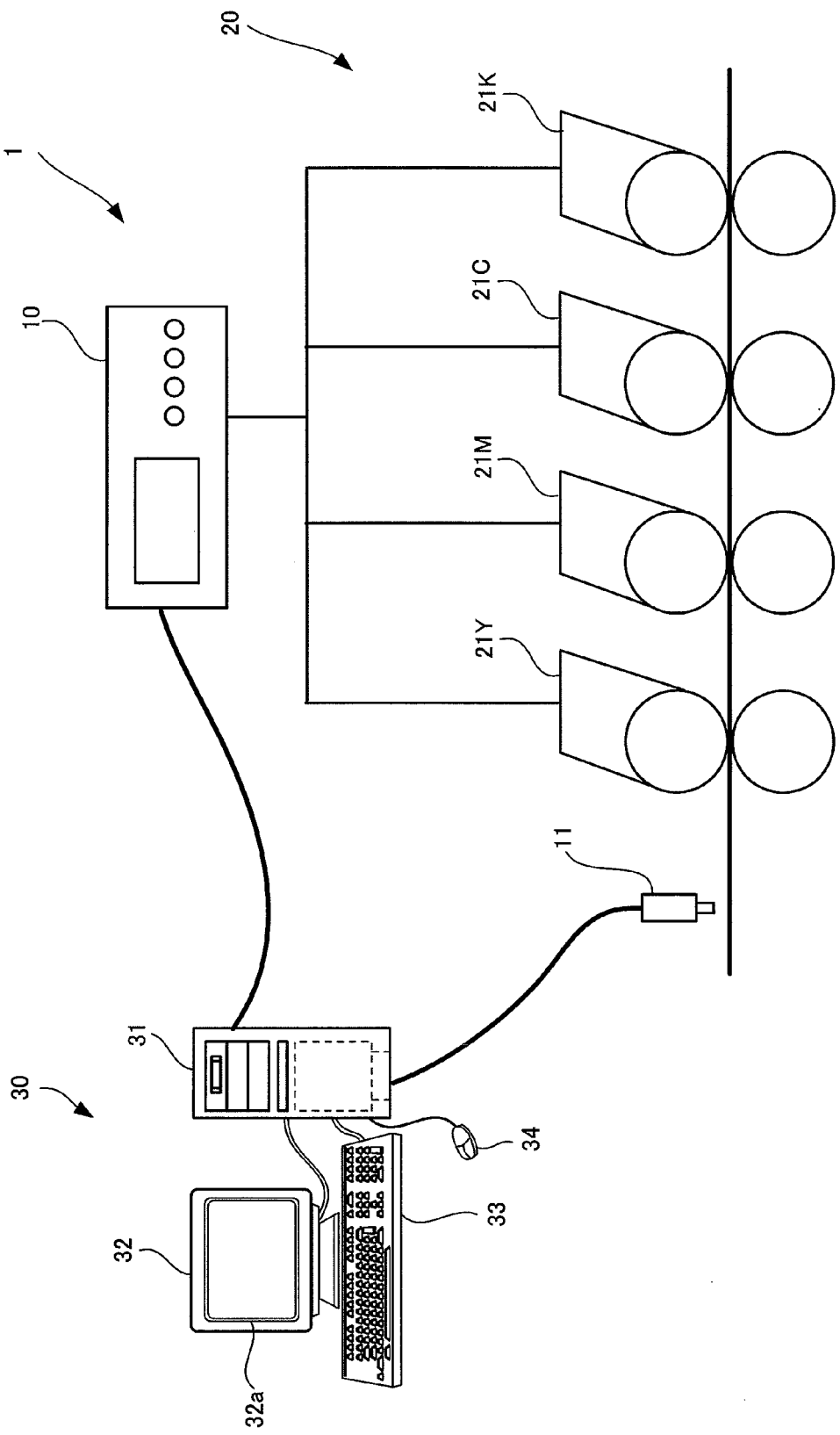
FIG. 1 is a view showing the entire structure of a printing system to which an embodiment of the present invention is applied.

FIG. 1 is a view showing the entire structure of a printing system to which an embodiment of the present invention is applied.

A printing system 1 shown in FIG. 1 mainly includes a printing machine 20 that forms a print image by using C, M, Y, and K color inks; a workstation 30 that generates print image data for representing a print image by editing an image; a control device 10 that controls the print densities of C, M, Y, and K color inks in the printing machine 20; and a colorimeter that performs the colorimetry of the print image. Meanwhile, the printing system 1 is actually connected to a color scanner that scans a document image or a printer that prints an image on the basis of image data, and further, to a reference printing machine (described later) via the internet, although not depicted in the drawing. The printing system 1 corresponds to an example of the first printing system of the present invention, and the reference printing machine corresponds to an example of the second printing system of the present invention.

R, G, and B color separated image data that are obtained by scanning a document by the color scanner (not shown); four C, M, Y, and K color separated image data that are made by a personal computer or the like; or three L*, a*, and b* color separated image data that are obtained by taking a photograph of a subject by a digital camera are input to the workstation 30. Electronic page-makeup based on the input color separated image data is performed in the workstation 30 by an operator, so that print image data representing image pages for printing are generated. Meanwhile, the printing machine 20 shows images by pixel groups. Dot percentage data of C, M, Y, and K color plates, which show images by pixel groups having dot percentages in the range of 0 to 100%, are used as the print image data. Generated print image data are sent to the printing machine 20.

The printing machine 20 is provided with a CTP (not shown) that generates C, M, Y, and K color printing plates; and image forming sections 21Y, 21M, 21C, and 21K that form C, M, Y, and K color plate images on a paper sheet by mounting printing plates thereon and by applying inks to the printing plates. A calorimeter 11, which performs the colorimetry of the print image formed on the paper sheet, is provided on the downstream side of the image forming sections 21Y, 21M, 21C, and 21K. If the print image data are transmitted to the printing machine 20, C, M, Y, and K color printing plates are generated on the basis of the print image data and mounted on the image forming sections 21Y, 21M, 21C, and 21K. In the image forming sections 21Y, 21M, 21C, and 21K, inks of which the print densities are controlled by the control device 10 are applied to the printing plates, and the inks are sequentially transferred onto the paper sheet so that C, M, Y, and K color plate images are formed on the paper sheet and are sequentially superimposed. Accordingly, a print image is formed.

In this case, the degree of light reflection on the surface of a paper sheet varies depending on the kinds of print media, such as a newspaper, an advertising matter, and a magazine. Accordingly, even though the same amount of the same color ink is supplied, the impression of the color of the completed print image varies. However, the color of a corporate logo does need to be always represented by the same color. For this reason, for important colors of a print image, it is required to match the colors of the print image to be generated by the printing machine 20 with the colors of the print image generated by the reference printing machine in which color adjustment has been previously performed. In the present embodiment, the printing system 1 is connected via the Internet line to the reference printing machine, and from the reference printing machine, the print densities of the C, M, Y, and K color inks after color adjustment are communicated to the workstation 30 to estimate colors on the print image printed by the reference printing machine (herein after the estimated color is referred to as a target color), thereby initial print densities of the C, M, Y, and K color inks as to realize the target color in the printing machine 20 are calculated. The calculated initial print densities are transmitted to the control device 10, and the open or closed state of an ink reservoir of each of the image forming sections 21Y, 21M, 21C, and 21K is adjusted by the control device 10, so that the print density of each color ink is set to the initial print density.

If the initial print densities of the inks are set, test printing is performed in the image forming sections 21Y, 21M, 21C, and 21K, and the color of the print image formed by the test printing is measured by the calorimeter 11, and the test printing is repeated while the print densities of the inks are finely adjusted in the control device 10. When a colorimetric value transmitted from the colorimeter 11 reaches a target color and the print densities of the inks are stabilized, a printing start signal is transmitted from the workstation 30 to the control device 10 and is converted into a test printing signal. Therefore, actual printing is performed. Since the initial print density of the ink is set to a value approaching a target print density for achieving a target color in this embodiment, the time required until the stabilization of the print density of the ink is shortened. As a result, the occurrence of spoilage is suppressed.

Herein, the contents of the processing performed by the workstation 30 will be described in detail below.

The workstation 30 is a large personal computer. As shown in FIG. 1, the workstation includes a main body device 31, in appearance, an image displaying device 32 that displays an image on a display screen 32a according to an instruction transmitted from the main body device 31, a keyboard 33 that is used to input various kinds of information corresponding to the key operation to the main body device 31, and a mouse 34 that is used to input an instruction corresponding to an icon displayed at an arbitrary position on the display screen 32a by designating the arbitrary position.

Figure 2:
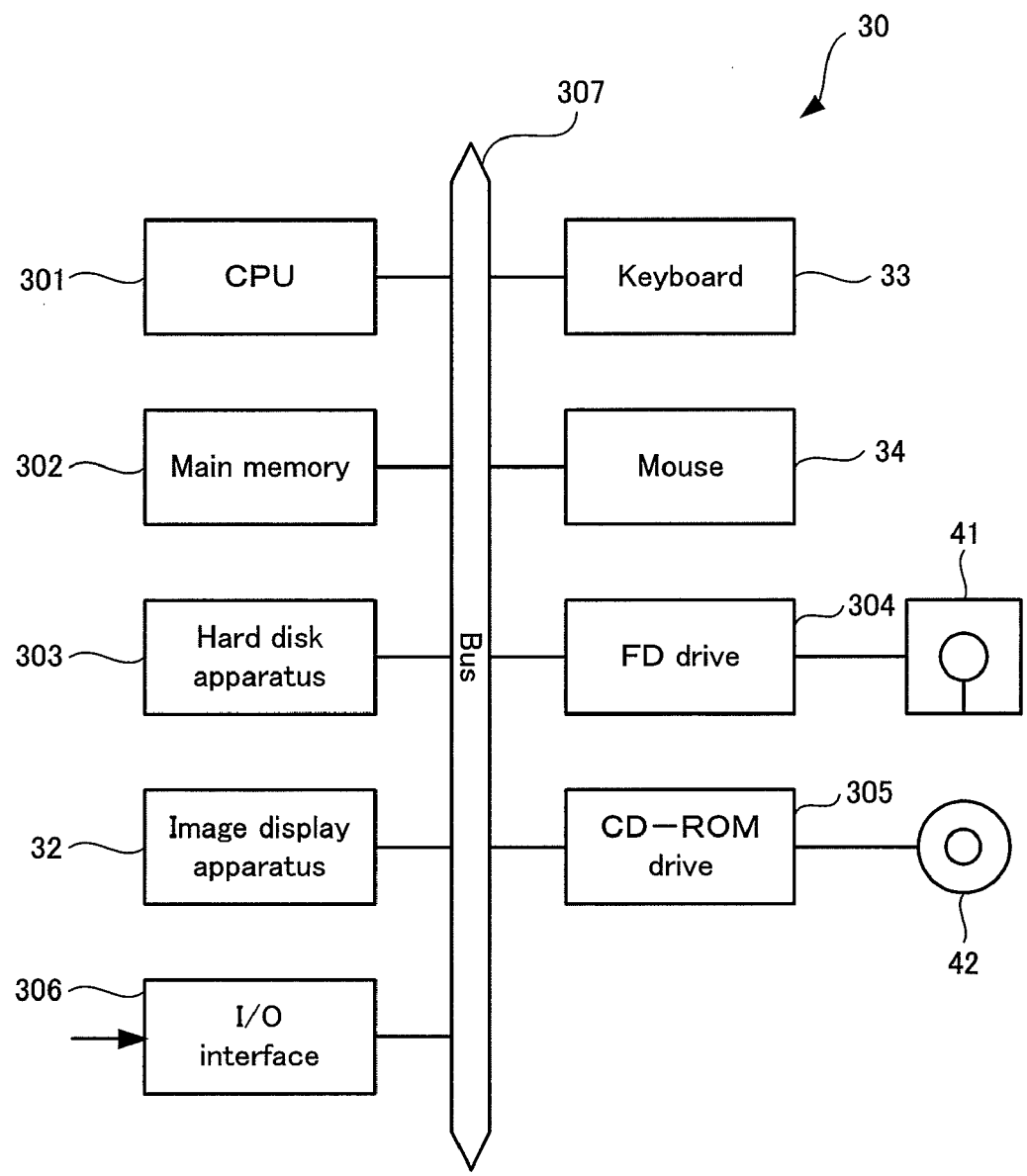
FIG. 2 is a view showing the structure of hardware of a workstation.

FIG. 2 is a view showing the structure of hardware of a workstation.

As shown in FIG. 2, a CPU 301 that executes various programs, a main memory 302 where the program stored in a hard disk device 303 is read out and developed to be executed by the CPU 301, a hard disk device 303 where various programs or data are stored, a FD drive 304 that loads a FD 41 thereon and has access to the FD 41, a CD-ROM drive 305 that has access to a CD-ROM 42, and an I/O interface 306 that receives image data from a management server 20 and sends various instruction data to the management server 20 are provided in the main body device 31 of the workstation 30. These various components, the image displaying device 32, the keyboard 33, and the mouse 34, which are shown in FIG. 1, are connected to one another by a bus 307.

In this case, a print density adjusting program 100 (see FIG. 3), which is an embodiment of each of a density calculating program and a density setting program of the present invention, is stored in the CD-ROM 42.

Figure 3:
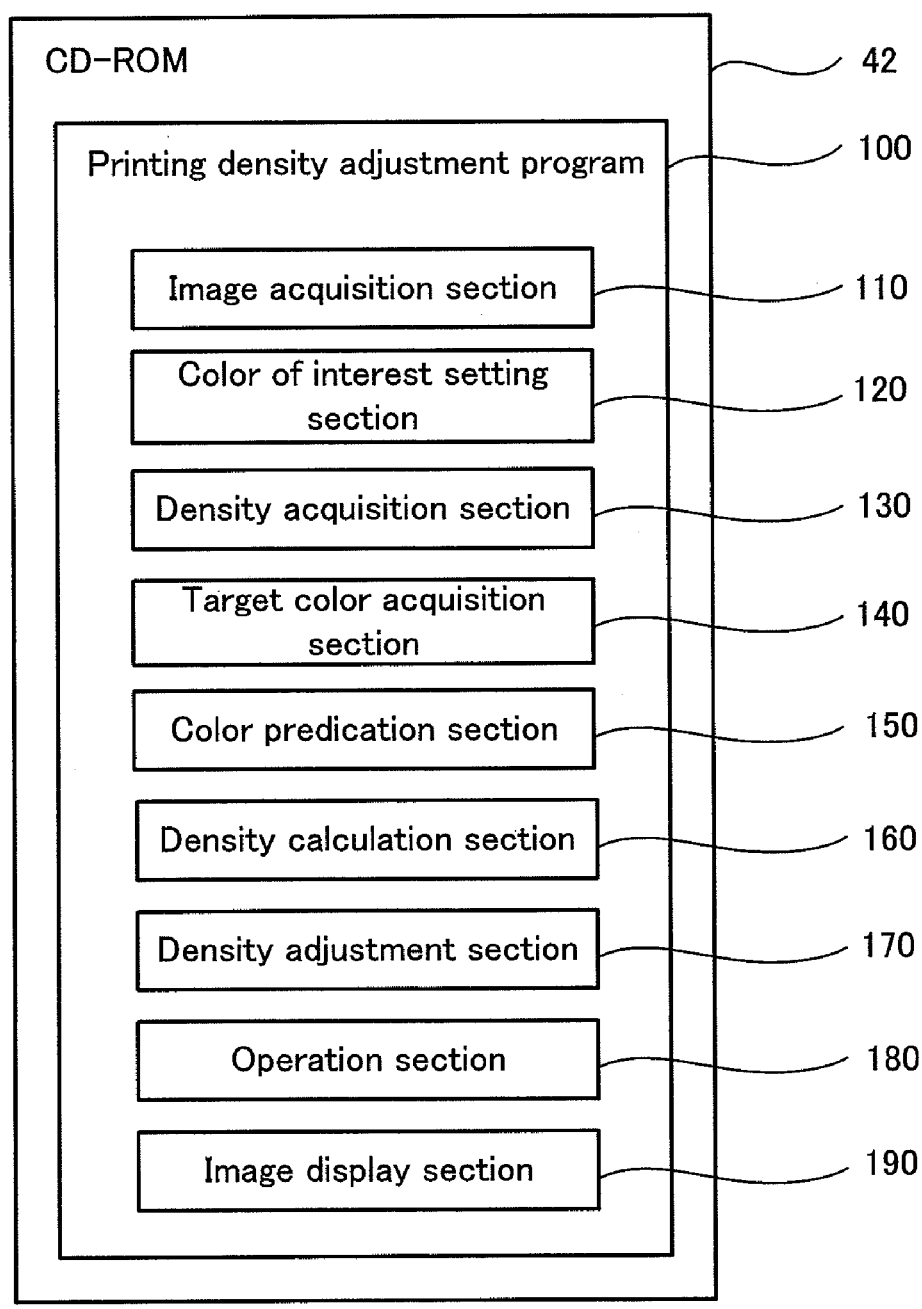
FIG. 3 is a conceptual diagram of a CD-ROM.

FIG. 3 is a conceptual diagram of the CD-ROM 42.

As shown in FIG. 3, the print density adjusting program 100 stored in the CD-ROM 42 includes an image acquisition section 110, a noticeable color setting section 120, a density acquisition section 130, a target color acquisition section 140, a color forecasting section 150, a density calculation section 160, a density adjusting section 170, an operation section 180 and an image displaying section 190.

The CD-ROM 42 is loaded on the CD-ROM drive 305 of the workstation 30, and the print density adjusting program 100 stored in the CD-ROM 42 is uploaded to the workstation 30 and stored in the hard disk device 303. Further, if the print density adjusting program 100 starts and is executed, a print density adjusting apparatus 200 (see FIG. 4), which is an embodiment of each of a density calculating apparatus and a density setting apparatus of the present invention, is formed in the workstation 30.

Meanwhile, the CD-ROM 42 has been exemplified in the above description as a storage medium that stores the print density adjusting program 100. However, a storage medium that stores the print density adjusting program 100 is not limited to the CD-ROM, and may be a storage medium, such as an optical disk, a MO, a FD, or a magnetic tape in addition to this. Further, the print density adjusting program 100 may be directly provided to the workstation 30 through an I/O interface 306 without a storage medium.

The details of each part of the print density adjusting program 100 will be described together with the operation of each part of the print density adjusting apparatus 200.

Figure 4:
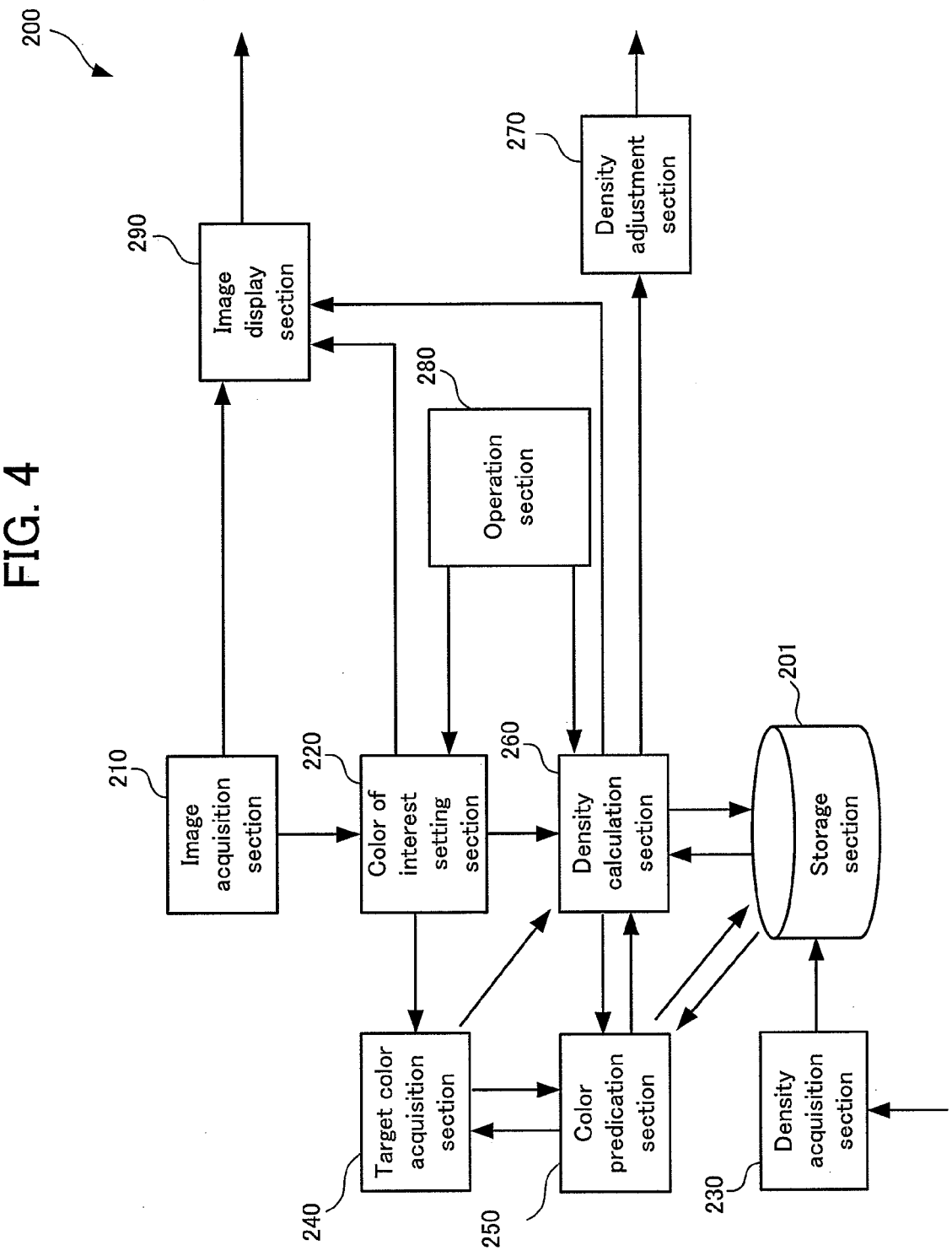
FIG. 4 is a functional block diagram of a print density adjusting apparatus.

FIG. 4 is a functional block diagram of the print density adjusting apparatus 200.

The print density adjusting apparatus 200 includes an image acquisition section 210, a noticeable color setting section 220, a density acquisition section 230, a target color acquisition section 240, a color forecasting section 250, a density calculation section 260, a density adjusting section 270, an operation section 280, an image displaying section 290, and a storage section 201. The image acquisition section 210, noticeable color setting section 220, density acquisition section 230, target color acquisition section 240, color forecasting section 250, density calculation section 260, density adjusting section 270, operation section 280, and image displaying section 290 included in the print density adjusting apparatus 200 correspond to the image acquisition section 110, noticeable color setting section 120, density acquisition section 130, target color acquisition section 140, color forecasting section 150, density calculation section 160, density adjusting section 170, operation section 180, and image displaying section 190 included in the print density adjusting program 100 of FIG. 3, respectively.

The components of FIG. 4 are different from those of FIG. 3 in that each of the components shown in FIG. 4 is composed of the combination of an OS and application programs that are executed by hardware of the computer and the computer, but each of the components of the print density adjusting program 100 shown in FIG. 3 is composed of only application programs thereof.

Figure 5:
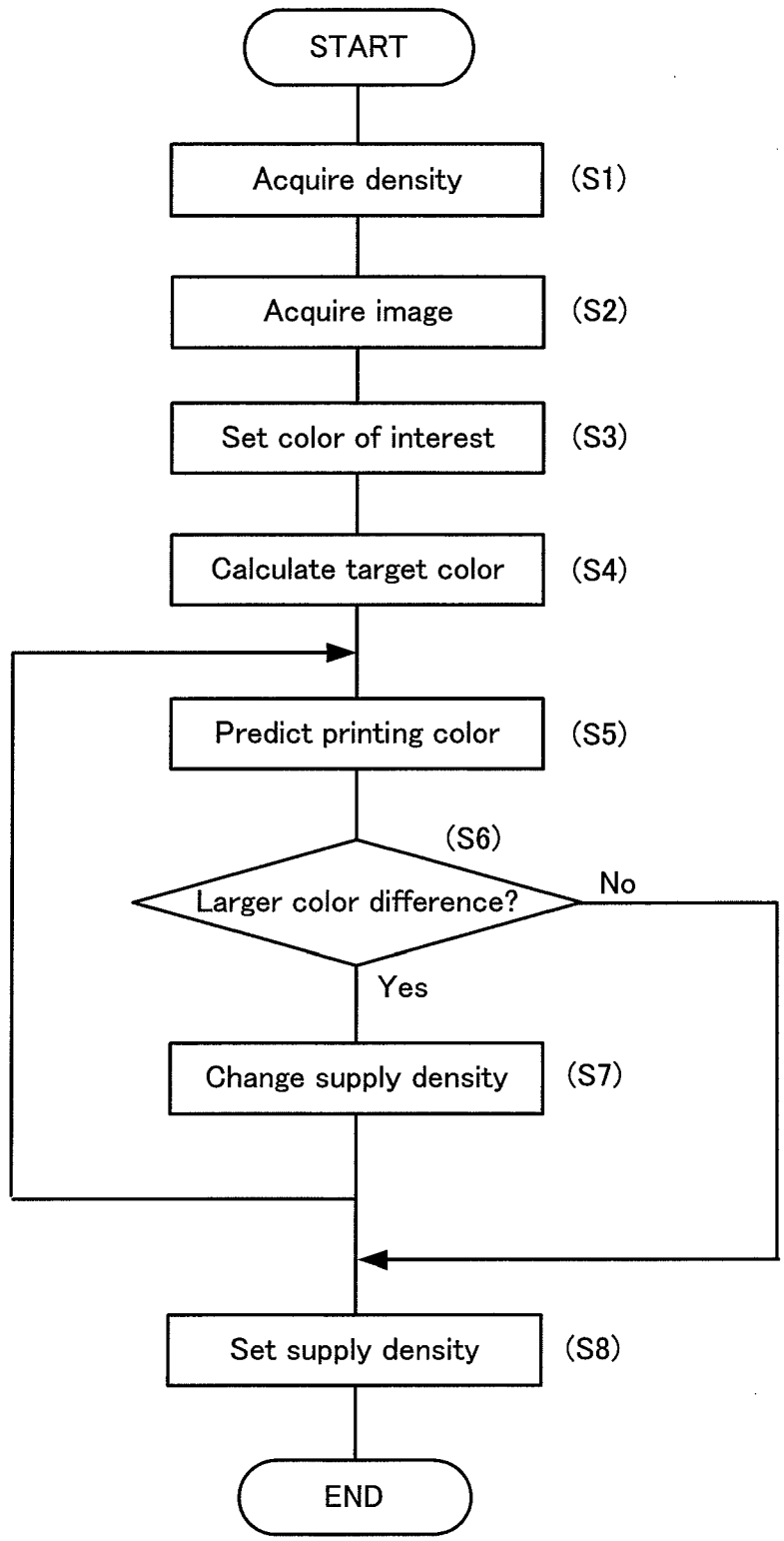
FIG. 5 is a flowchart illustrating a series of processing until the print density of an ink is set.

FIG. 5 is a flowchart illustrating a series of processing until the print density of an ink of the printing machine 20 is set in the print density adjusting apparatus 200 shown in FIG. 4.

Hereinafter, the operation of each component of the print density adjusting apparatus 200 shown in FIG. 4 will be described in accordance with the flowchart of FIG. 5, together with each component of the print density adjusting program 100 shown in FIG. 3.

Prior to printing, information for calculating a target color of a print image in the printing machine 20 is transmitted from the reference printing machine to the workstation 30.

When a print image is formed on the basis of print image data where the dot percentages of C, M, Y, and K colors are 100%, the print densities of the inks of the C, M, Y, and K colors in the reference printing machine are set to standard print densities where the colors of the print image become previously determined standard colors. In the following description, a state where the print densities of the inks are set to the standard print densities is referred to as a standard state.

If the reference printing machine is set to a standard state, a chart image where several patches having different colors line up is printed on the basis of previously provided chart image data and the colorimetry of each of the patches is performed by a calorimeter.

Then, while the print densities of the C, M, Y, and K color inks have been independently changed into −0.2, −0.1, +0.1, and +0.2 with respect to the standard print densities, respectively, the chart image is printed on the basis of the chart image data. In the following description, a state where the print densities of the inks are changed from the standard print densities is referred to as a changed state. In this embodiment, the C, M, Y, and K colors are set to the changed states of "standard print density −0.2", "standard print density −0.1", "standard print density +0.1", and "standard print density +0.2", respectively. Accordingly, a total of 16 chart images are printed. The colorimetry of each patch of the formed chart images is also performed.

In the present embodiment, the print densities of the inks of the 16 chart images, the dot percentages of the patches of each chart image, and the calorimetric values are transmitted from the reference printing machine to the workstation 30.

Accordingly, the color forecasting section 250 calculates a corresponding relationship among the dot percentage of the input data, the print density of the inks, and the forecast print color in the reference printing machine, with the use of the print density of the inks of the each chart image, the dot percentage of the patch, and the calorimetric values of the patch image transmitted from the reference printing machine. The calculated corresponding relationship is stored in the storing section 201. A more detailed explanation about a method for calculating a forecast print color will follow.

Also in the printing machine 20, like in the reference printing machine, a chart image is printed while the print densities of the C, M, Y, and K color inks are set to the standard print density, and the colorimetry of each patch of the formed chart images is also performed. Then the print densities of the C, M, Y, and K color inks are set to the changed states of "standard print density −0.2", "standard print density −0.1", "standard print density +0.1", and "standard print density +0.2", respectively, to print a total of 16 chart images, and the colorimetry of each patch of the formed chart images is also performed. Further, the color forecasting section 250 calculates a corresponding relationship among the dot percentage of the input data, the print density of the inks, and the forecast print color in the printing machine 20, with the use of the print density of the inks of the each chart image in the printing machine 20, the dot percentage of the patch, and the calorimetric values of the patch image. The calculated corresponding relationship is stored in the storing section 201 as well.

This preparation processing for printing described above is carried out.

When a printed image is actually created in the printing machine 20, the reference printing machine transmits the print densities of the reference ink of color matched C, M, Y, and K colors to the workstation 30. The print densities of the reference ink transmitted from the reference printing machine are acquired by the density acquisition section 230 of FIG. 4 via the I/O interface 306 of FIG. 2 (step S1 of FIG. 5). The density acquisition section 230 corresponds to one example of the density acquisition section according to the present invention.

The print image data is acquired by the image acquisition section 210 of FIG. 4 (Step S2 of FIG. 5). As described above, in this embodiment, dot percentage data of C, M, Y, and K color plates, which show images by pixel groups having dot percentages in the range of 0 to 100%, are acquired as the print image data. The image acquisition section 210 corresponds to an example of an image data acquisition section of the present invention. The acquired print image data are transmitted to the noticeable color setting section 220 and the image displaying section 290.

The image displaying section 290 displays a noticeable color setting screen, which is used to set important noticeable colors of the colors of the pixels of the print image (that is, a place of the print image) for representing the print image data, on the display screen 32a of FIG. 1.

Figure 6:
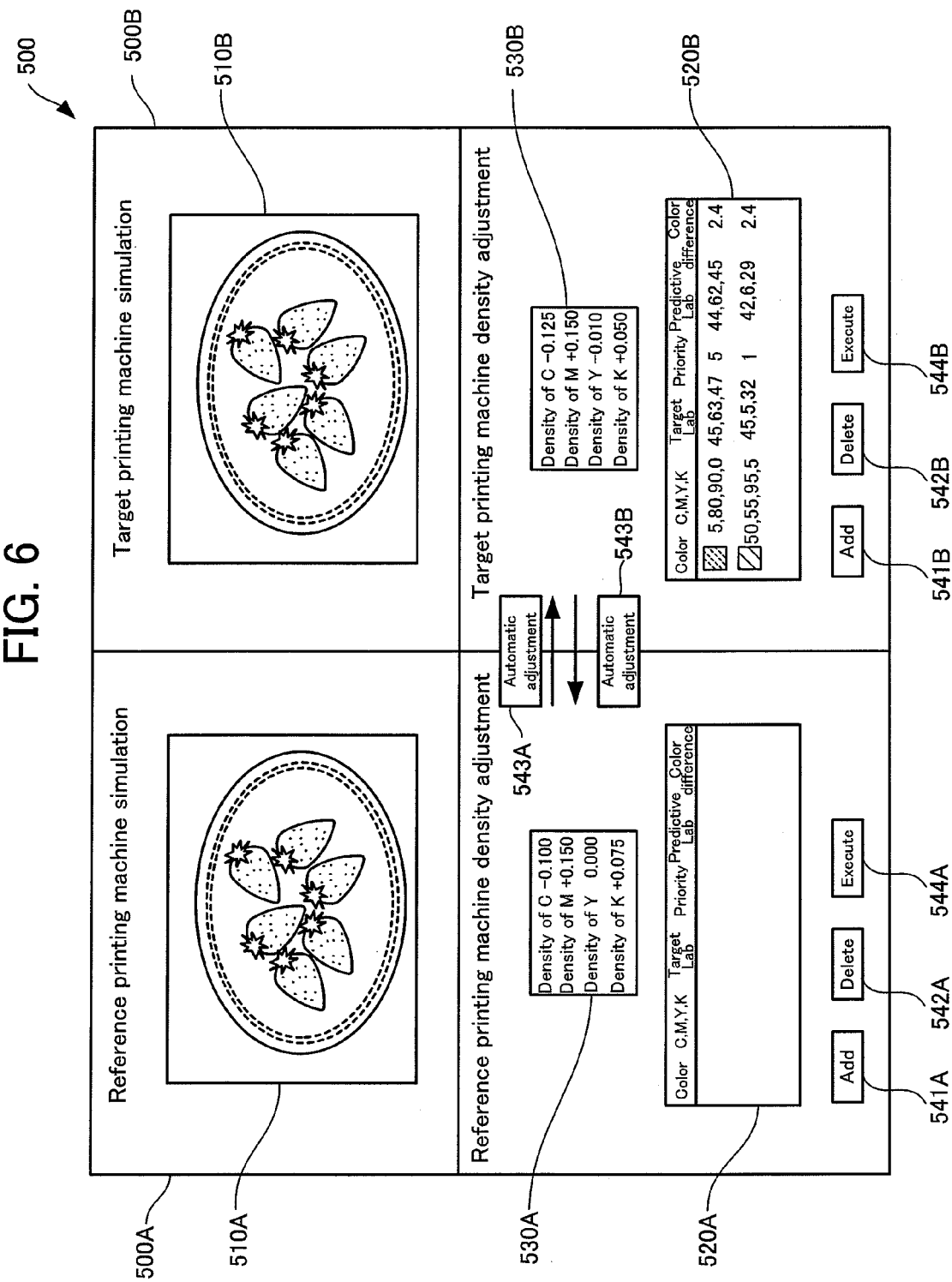
FIG. 6 is a view showing an example of a noticeable color setting screen.

FIG. 6 is a view showing an example of the noticeable color setting screen.

A noticeable color setting screen 500 shown in FIG. 6 includes a reference information display section 500A which displays various kinds of information in the reference printing machine and a target printing machine information display section 500B which displays various kinds of information in the printing machine 20 shown in FIG. 1. And the reference information display section 500A and the target printing machine information display section 500B include a print image 510A(510B) represented by the print image data, a color information displaying section 520A(520B) that shows information relating to a noticeable color set using the noticeable color setting screen 500, a manual density adjusting section 530A(530B) that is used to manually adjust the print density of inks in the printing machine 20, an ADD button 541A(541B) that is used to add a noticeable color, a DELETE button 542A(542B) that is used to delete a noticeable color, an automatic adjustment button 543A(543B) that is used to begin to calculate the initial print density of the inks, and an EXECUTE button 544A(544B) that is used to execute the setting of the print density of the inks on the printing machine 20.

In an example shown in FIG. 6, it is possible to realize a print color of the reference printing machine by switching between the printing machine subjected to the adjustment of print density of inks and the target printing machine. The adjustment in a positive direction for adjusting the print density of inks in the printing machine 20 shown in FIG. 4 is made to realize the print color of the reference printing machine, while the adjustment in a negative direction for adjusting the print density of inks in the reference printing machine is made to realize the print color of the printing machine 20 shown in FIG. 4. In the following, an explanation is made about the adjustment in the positive direction to adjust the print density of inks of the printing machine 20 shown in FIG. 4.

If a user selects the ADD button 541 by using the mouse 34 or the like, a designation method selecting screen used to select a method of designating a noticeable color is displayed on the display screen 32a of FIG. 1.

Figure 7:
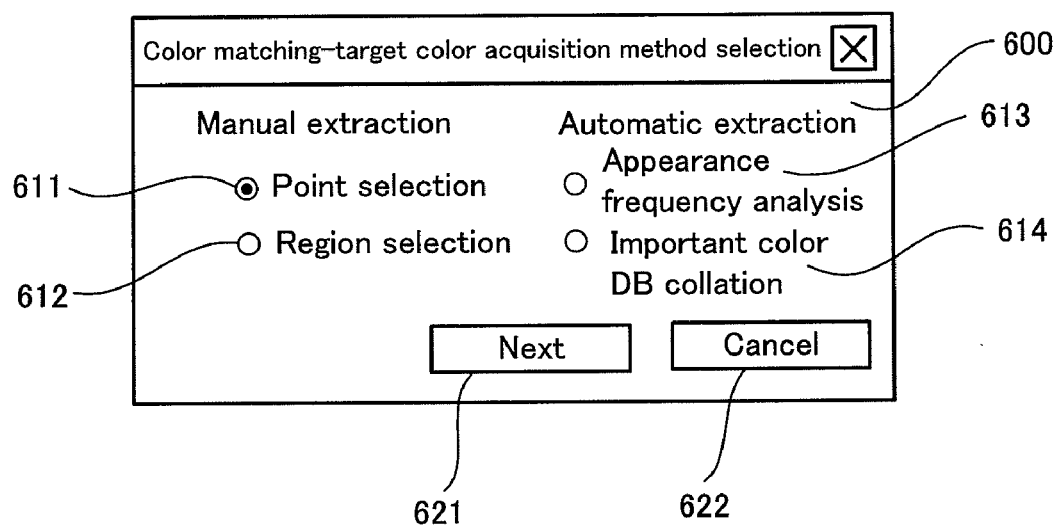
FIG. 7 is a view showing an example of a designation method selecting screen.

FIG. 7 is a view showing an example of the designation method selecting screen.

The designation method selecting screen 600 includes various radio buttons that are used to manually designate noticeable colors, various radio buttons that are used to automatically designate noticeable colors, a NEXT button 621 that is used to display the information of the designated noticeable colors, and a CANCEL button 622 that is used to cancel the setting. A point selecting radio button 611 that is used to designate a color of the point as a noticeable color by selecting a point on a print image 510B shown in FIG. 6, and a region radio button 612 that is used to designate an average value or a mode value of a color of a region as a noticeable color by selecting the region on the print image 510B shown in FIG. 6 are provided as the radio buttons that are used to manually designate noticeable colors. A frequency analysis radio button 613 that is used to designate a color, which frequently appears in the print image 510B, as a noticeable color; and a DB checking radio button 614 that is used to designate important colors, which are previously stored in the storage section 201 shown in FIG. 4, as noticeable colors are provided as the radio buttons that are used to automatically designate noticeable colors.

If a user selects the point selecting radio button 611 or the region radio button 612 and then selects the NEXT button 621 by using the mouse 34 or the like, the noticeable color setting screen 500 shown in FIG. 6 is displayed again.

If a noticeable point is selected on the print image 510B of the noticeable color setting screen 500 while the point selecting radio button 611 is selected, the position information of the noticeable portion is transmitted from the operation section 280 shown in FIG. 4 to the noticeable color setting section 220. The dot percentage data that represents a noticeable portion represented by the position information, which is transmitted from the operation section 280, of the print image data 510B is acquired in the noticeable color setting section 220. Further, the color represented by the dot percentage data is provisionally set as a noticeable color.

Further, if a region including important colors is selected on the print image 510B of the noticeable color setting screen 500 while the region radio button 612 is selected, the position information of the region is transmitted from the operation section 280 of FIG. 4 to the noticeable color setting section 220. The dot percentage data in a region represented by the position information, which is transmitted from the operation section 280, of the print image data 510B is acquired in the noticeable color setting section 220. Further, the average color of colors represented by the dot percentage data is provisionally set as a noticeable color.

When a noticeable color is provisionally set, the display of a set color information screen, which displays the information of the noticeable color, is instructed from the noticeable color setting section 220 to the image displaying section 290. Accordingly, the set color information screen is displayed on the display screen 32a.

FIG. 8 is a view showing an example of the set color information screen.

Figure 8A:
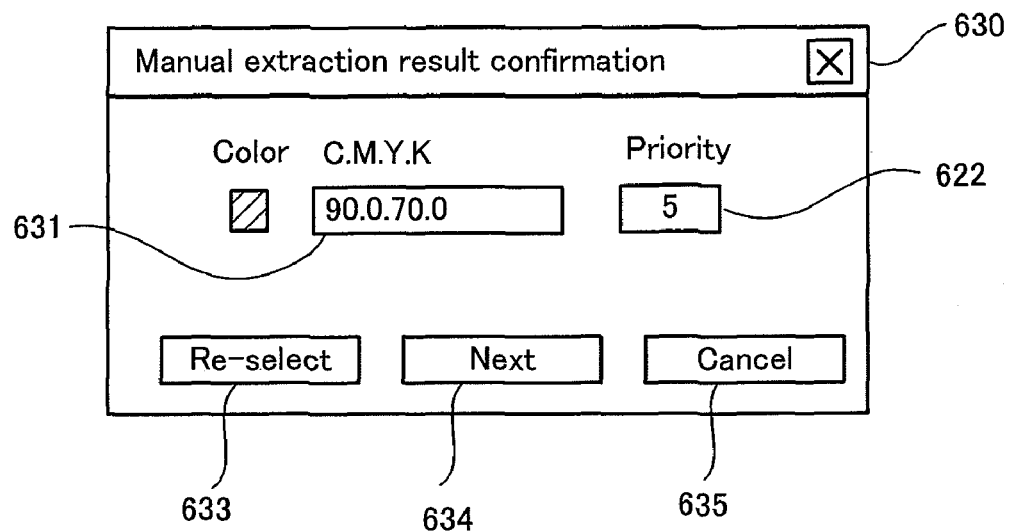
FIG. 8 is a view showing an example of a set color information screen.

FIG. 8A shows an example of a provisionally set color information screen 630 that displays the information of the noticeable color provisionally set by the noticeable color setting screen 500. A color value displaying section 631 that displays dot percentages of C, M, Y, and K colors of the provisionally set noticeable color; a priority setting section 632 that is used to set the priority of the noticeable color; a reselection button 633 that is used to return to the noticeable color setting screen 500 and to reselect a noticeable color; a CANCEL button 635 that is used to cancel the setting of the noticeable color; and a NEXT button 634 that is used to determine the noticeable color and to set a target color of the noticeable color are provided on the provisionally set color information screen 630.

The dot percentage of the noticeable color, which is provisionally set in the noticeable color setting section 220, is displayed on the color value displaying section 631. However, a user can manually and finely adjust a dot percentage. Further, in this embodiment, the priorities set in the priority setting section 632 correspond to five steps, that is, first to fifth steps. As the numerical value is increased, the priority becomes high.

The noticeable color is manually set as described above.

Furthermore, if a user selects the frequency analysis radio button 613 or the DB checking radio button 614, which is a radio button used to automatically designate a noticeable color, on the designation method selecting screen 600 of FIG. 7 and then selects the NEXT button 621, the contents of the selection are transmitted from the operation section 280 to the noticeable color setting section 220.

If the frequency analysis radio button 613 is selected, several dot percentages, which represent all pixels on the print image of the print image data, are analyzed in the noticeable color setting section 220. Accordingly, the total number of pixels having the same dot percentage is calculated. In addition, the dot percentage, which corresponds to the large calculated total number, is selected as a predetermined numeral (two in this embodiment), and the color represented by the selected dot percentage is provisionally set as a noticeable color.

If the DB checking radio button 614 is selected, the information about the important colors previously stored in the storage section 201 is acquired in the noticeable color setting section 220 and the important colors are provisionally set as noticeable colors. Not only a flesh color, a gray color, and the like, which determine the impression of a printed matter, but also the color of a corporate logo, a corporate color, and the color of a product are stored as the important colors.

When a noticeable color is set, the display of the set color information screen, which displays the information of the noticeable color, is instructed from the noticeable color setting section 220 to the image displaying section 290. Accordingly, the set color information screen is displayed on the display screen 32a.

Figure 8B:
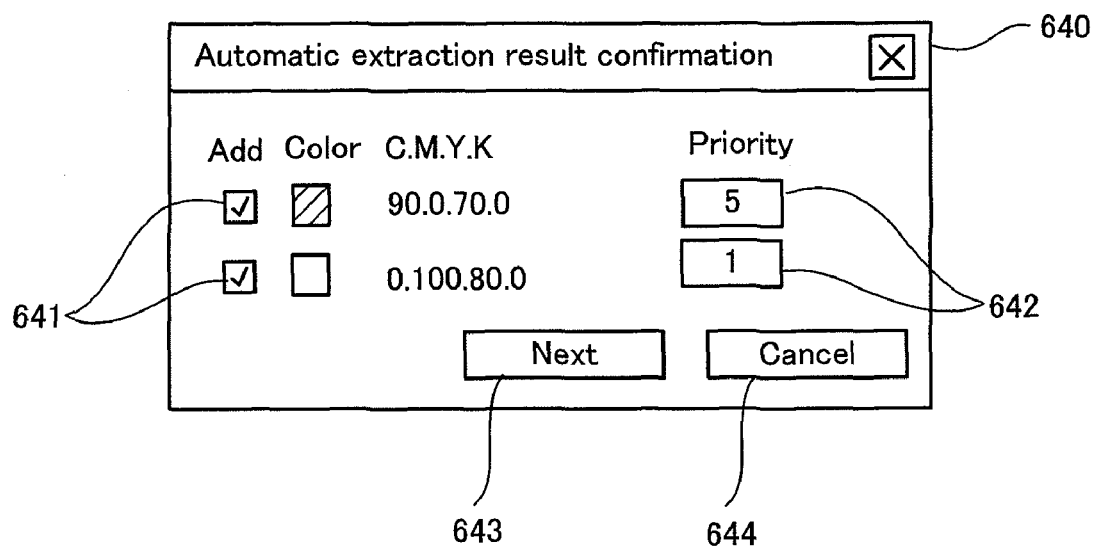

FIG. 8B shows an example of an automatically set color information screen 640 that displays the information of the noticeable color automatically and provisionally set by the noticeable color setting screen 500. Priority setting sections 642 that display the dot percentages of the set noticeable colors and are used to set the priorities of the noticeable colors, check boxes 641 that are used to determine the addition of noticeable colors, a CANCEL button 644 that is used to cancel the setting of the noticeable colors, and a NEXT button 643 that is used to set target colors of the noticeable colors are provided on the automatically set color information screen 640.

The noticeable color is automatically set as described above.

If a user selects the NEXT buttons 634 and 643 shown in FIG. 8 by using the mouse 34 or the like, the setting contents set on the provisionally set color information screen 630 or the automatically set color information screen 640 are transmitted from the operation section 280 to the noticeable color setting section 220. The noticeable color setting section 220 sets the color, which is represented by the final dot percentage included in the transmitted setting contents, as a noticeable color (Step S3 of FIG. 5). The combination of the operation section 280 and the noticeable color setting section 220 corresponds to an example of a place designating section in the present invention. The dot percentage of the set noticeable color is transmitted to the target color acquisition section 240 and the density calculation section 260.

When the dot percentage of the noticeable color is transmitted, the forecast of a print color of the target color in the reference printing machine is instructed from the target color acquisition section 240 to the color forecasting section 250.

Accordingly, the color forecasting section 250 calculates the print color of the target color in the reference printing machine (Step S4 of FIG. 5).

The description of the flowchart of FIG. 5 is stopped once, and a method of forecasting a print color is described herein.

As described above, in the present embodiment, while the print densities of the C, M, Y, and K color inks are set to the changed states of "standard print density −0.2", "standard print density −0.1", "standard print density +0.1", and "standard print density +0.2", respectively, a total of 16 chart images are printed, and colorimetry of each patch of the formed chart images is also performed.

Herein, when the print densities of the C, M, Y, and K color inks are changed by a desired variation with respect to the standard print densities, respectively, the print color R of the patch can be approximately obtained as follows:

$$R=R_{(std)}+R_{\Delta C}+R_{\Delta M}+R_{\Delta Y}+R_{\Delta K} \quad (1)$$

In this case, the colorimetric value of the patch printed by a reference printing machine set to the standard print density is $R_{(std)}$, a difference between the calorimetric value of the patch when the print density of only the C color ink is changed and the calorimetric value of the patch printed with the standard print density is $R_{\Delta C}$, a difference between the calorimetric value of the patch when the print density of only the M color ink is changed and the calorimetric value of the patch printed with the standard print density is $R_{\Delta M}$, a difference between the calorimetric value of the patch when the print density of only the Y color ink is changed and the calorimetric value of the patch printed with the standard print density is $R_{\Delta Y}$, and a difference between the calorimetric value of the patch when the print density of only the K color ink is changed and the calorimetric value of the patch printed with the standard print density is RΔK. Colorimetric values, which are obtained by the colorimetry of each of the patches of the chart image printed in the standard state and the total of 16 chart images printed in the changed states, are substituted in Expression (1), so that a corresponding relationship between the print density of inks (standard print density±variation) and the print color R of the patch is obtained for each patch. That is, the print color of the patch can be forecasted from the dot percentage of the patch and the print density of the inks. Further, the print color R, which corresponds to the minute variation of the print density of the inks, is also calculated by performing interpolation processing on the print density of the inks. In addition, the print colors R, which corresponds to several colors, are also calculated by performing the interpolation processing on the dot percentages of the patches.

As described above, a corresponding relationship among the dot percentage of the input data, the print density of the inks, and the forecast print color in the reference printing machine is calculated by the color prediction section 250 beforehand, and the calculated corresponding relationship is stored in the storage section 201.

In Step S4 of FIG. 5, in the color prediction section 250 shown in FIG. 4, a forecast print color which corresponds to the print density of the reference ink of the reference printing machine acquired in Step S1 of FIG. 5 and the dot percentages of the noticeable colors transmitted from the target color acquisition section 240 is acquired, on the basis of the corresponding relationship of the reference printing machine stored in the storage section 201. This forecast print color indicates a print color of the noticeable colors in the print image when the print image is printed on the basis of the print image data in the reference printing machine in which color-matching has been performed by using color samples.

In the present embodiment, once the corresponding relationship of the reference printing machine is stored, when actually performing the printing, it is only necessary to acquire a print density of the reference ink from the reference printing machine, thereby enabling obtaining a print color of the reference printing machine for a desired color while suppressing the quantity of data to be transmitted from the reference printing machine. The color forecasting section 250 corresponds to one example of the second color guess section of the present invention. The print colors for each of the noticeable colors that are acquired are transmitted to the target color acquisition section 240.

The target color acquisition section 240 acquires the print colors transmitted from the color forecasting section 250 as tentative colors for each of the noticeable colors.

If the tentative target colors are acquired, a target color determining screen appears on the display screen 32a.

Figure 9:
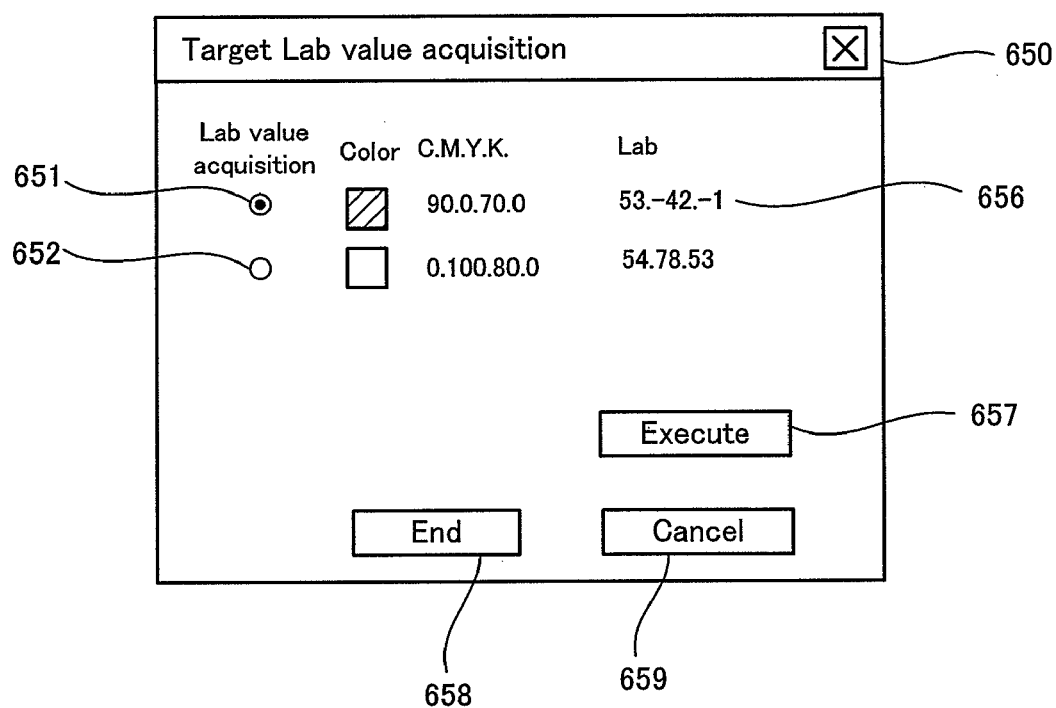
FIG. 9 is a view showing an example of a target color determining screen.

FIG. 9 is a view showing an example of the target color determining screen.

The target color determining screen 650 includes radio buttons 651 and 652 that display the dot percentages of the set noticeable colors and are used to determine noticeable colors for determining target colors, an EXECUTE button 657 that is used to instruct a target color to be determined, an END button 658 that is used to transmit a fact that target colors of all noticeable colors are acquired, a CANCEL button 659 that is used to instruct the acquisition of the target color to be cancelled, and a target color displaying section 656 on which the acquired target color is displayed.

If target colors are provisionally confirmed with respect to all noticeable colors displayed on the target color determining screen 650 and a user selects the END button 658 by using the mouse 34, the provisionally set target colors are determined as final target colors in the target color acquisition section 240 (Step S4 of FIG. 5). The target color acquisition section 240 corresponds to an example of a target color acquisition section in the present invention. The determined target colors are transmitted to the density calculation section 260.

Further, when the target colors are determined, the noticeable color setting screen 500 shown in FIG. 6 is displayed again on the display screen 32a shown in FIG. 1. If a user selects the automatic adjustment button 543 by using the mouse 34, the initial print density of inks begins to be calculated. First, a decision selecting screen is displayed. The decision selecting screen is used to select a decision condition for deciding that a print color of a noticeable color, when the print image is formed in the printing machine 20 on the basis of the print image data, is adjusted into a target color of the noticeable color.

Figure 10:
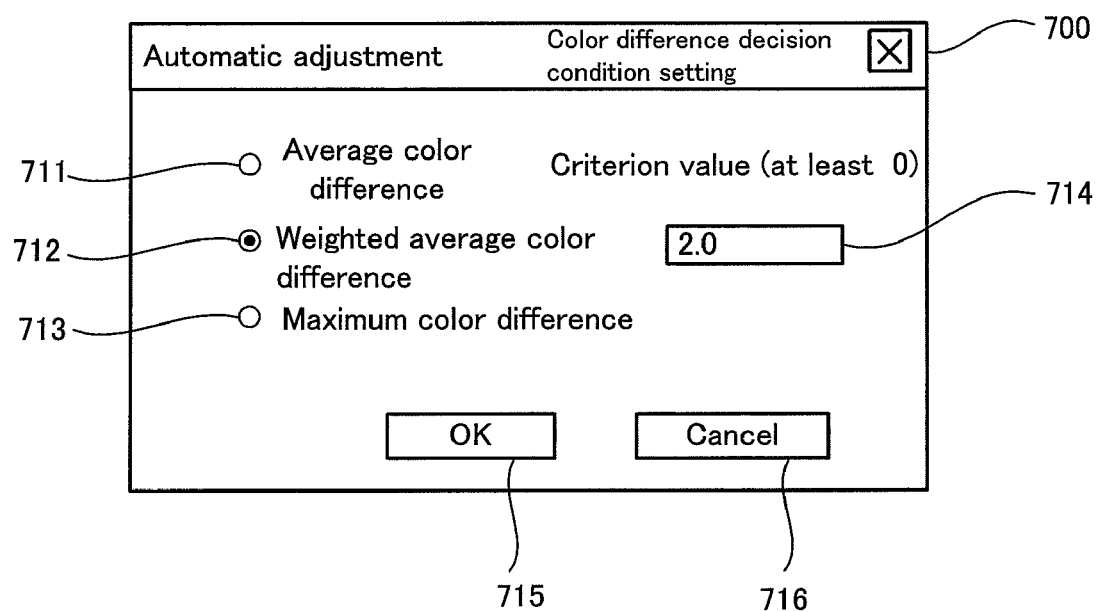
FIG. 10 is a view showing an example of a decision selecting screen.

FIG. 10 is a view showing an example of the decision selecting screen.

A color difference input section 714 where a decision criterion of a color difference, when it is decided that the print color is adjusted into the target color, is input; a mean color difference radio button 711 that is used to make a decision by using the mean color difference of noticeable colors; a weighted mean color difference radio button 712 that is used to make a decision by using the mean color difference weighted according to each of the noticeable colors; a maximum color difference radio button 713 that is used to make a decision by using the largest color difference of the color differences of the noticeable colors; an OK button 715 that is used to fix the setting contents; and a CANCEL button 716 that is used to cancel the setting are provided on the decision selecting screen 700.

If a user selects the color difference of the decision criterion and the kind of the color difference to be used by using the mouse 34, the contents of the selection are transmitted from the operation section 280 to the density calculation section 260.

The calculation of the initial print density of inks begins in the density calculation section 260.

First, the density calculation section 260 determines a tentative print density of inks common to each of the noticeable colors, to forecast a print color for the noticeable colors when a print image is created based on the print image data in the printing machine 20 in which the tentative print density of the inks is set (step S5 of FIG. 5).

As described above, also in the printing machine 20, like in the reference printing machine, prior to actual printing, a chart image is printed and the colorimetry is performed for each patch on the chart image beforehand.

Moreover, in the color prediction section 250, a corresponding relationship between the print density of the inks and the print color R of the patch is calculated for each of the patches by substituting the measured color value of the each patch into the formula (1). Further, by the interpolation processing, a corresponding relationship among the dot percentages of the input data, the print density of the inks, and the forecast print color in the printing machine 20 is calculated. The corresponding relationship among the dot percentages of the input data, the print density of the inks, and the forecast print color in the printing machine 20 is also stored in the storage section 201, prior to the printing.

The color prediction section 250 acquires a print color for each of the noticeable colors, corresponding to the tentative print density of the inks and the dot percentages of the noticeable colors on the basis of the relationship of the printing machine 20 stored in the storage section 201.

After the density calculation section 260 acquires the target color of the noticeable print color from the target color acquisition section 240 and the print color of the noticeable print color in the printing machine 20 from the color forecasting section 250, it is decided whether the color difference between the print color and the target color is larger than a reference color difference (Step S6 of FIG. 5). If only one noticeable color is set, the color difference between the target color and the print color is determined as the color difference of a decision subject as it is. When the mean color difference radio button 711 is selected on the decision selecting screen 700 shown in FIG. 10 if several noticeable colors are set, an average value of the color differences between a target color and the print colors of the noticeable colors is determined as a color difference of the decision subject. When the weighted mean color difference radio button 712 is selected thereon if several noticeable colors are set, a weighted average value is calculated by weighting the color differences between a target color and the print colors of the several noticeable colors so that the color difference having a higher priority is highly weighted, and the calculated weighted average value is determined as a color difference of the decision subject. When the maximum color difference radio button 713 is selected thereon if several noticeable colors are set, the maximum color difference of the color differences between a target color and the print colors of the several noticeable colors is determined as a color difference of the decision subject. Then, it is decided whether the color difference of the decision subject is larger than the reference color difference input in the color difference input section 714.

If the color difference of the decision subject is larger than the reference color difference (YES in Step S6 of FIG. 5), the print density of the inks is changed by a predetermined value (Step S7 of FIG. 5) and the forecast of the print color in Step S5 is performed again in the color forecasting section 250. In addition, the color difference between the target color and the print color of the noticeable color in the print density of a new ink is decided. A method of changing the print density of the ink will be described in detail later.

A series of processing composed of the change of the print density of the inks (Step S7 of FIG. 5), the forecast of the print color (Step S5 of FIG. 5), and the decision of the color difference (Step S6 of FIG. 5) are repeated until the color difference of the decision subject converges below the reference color difference (No in Step S6 of FIG. 5), or until the number of the repetition of the processing reaches the predetermined maximum number of repetition (for example, 3000 times). If the change of the print density of the inks is terminated, the print density of the inks at the time of the termination of the change thereof is provisionally determined as the initial print density. The density calculation section 260 corresponds to an example of the density calculation section in the present invention.

As a method of changing the print density of the inks, a method of forecasting the print colors of the combinations of all print densities and calculating print colors in a round robin manner while changing the adjustment amount of the print densities of C, M, Y, and K color inks in a predetermined adjustment range by a minute adjustment step (if print densities obtained from the combination of four C, M, Y, and K colors and 13 steps are used, 28561 print colors are calculated); or a method of calculating print colors and color differences while changing the adjustment amount of the print densities of C, M, Y, and K color inks in a predetermined adjustment range by a large adjustment step, and adjusting the adjustment amount of the print densities by a minute adjustment step only when a newly calculated color difference is smaller than the color difference having been calculated so far, may be used so that the color difference of the decision subject converges below the reference color difference. In this embodiment, (1) the print color and the color difference are calculated while the adjustment amount of the print densities of the inks is changed in a predetermined adjustment range (in the range of −0.15 to +0.15) by a large adjustment step (0.05), and (2) when a newly calculated color difference is smaller than the color difference having been calculated so far, the print colors and the color differences of 8 patterns where the C, M, Y, and K colors are changed in positive and negative directions by a minute adjustment step (0.025) are calculated. (3) In addition, returning to the processing (2), the print colors and the color differences are calculated by using the adjustment amount of the print densities corresponding to a direction where the minimum color difference of the calculated color differences of 8 patterns is calculated. Since the adjustment amount of the print densities is changed by a large adjustment step and the adjustment amount of the print densities is then changed by a minute adjustment step after the adjustment direction of the adjustment amount of the print densities is determined, as described above, it is possible to shorten the processing time that is required to determine the initial print density.

If the initial print density is provisionally determined, the density calculation section 260 transmits an instruction for displaying a calculation result displaying screen to the image displaying section 290 and the calculation result displaying screen is displayed on the display screen 32a.

FIG. 11 is a view showing an example of the calculation result displaying screen.

Figure 11A:
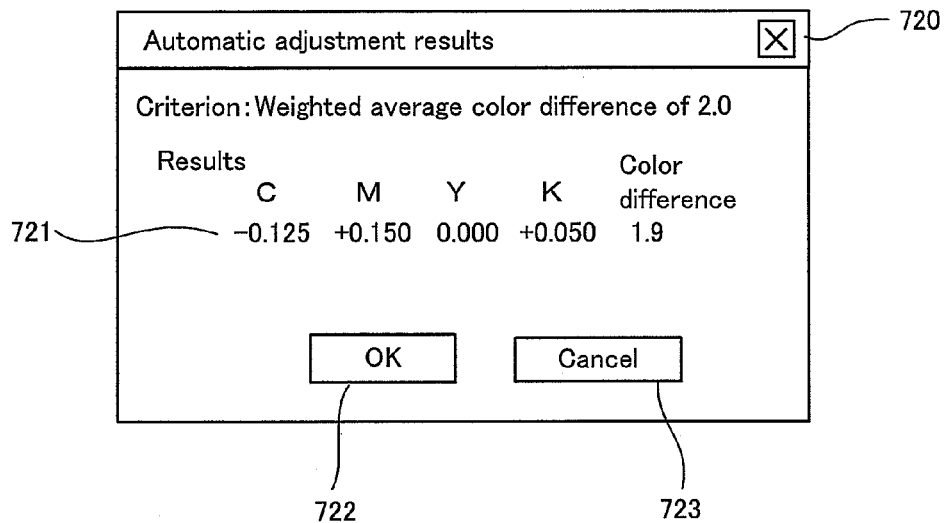
FIG. 11 is a view showing an example of a calculation result displaying screen.
Figure 11B:
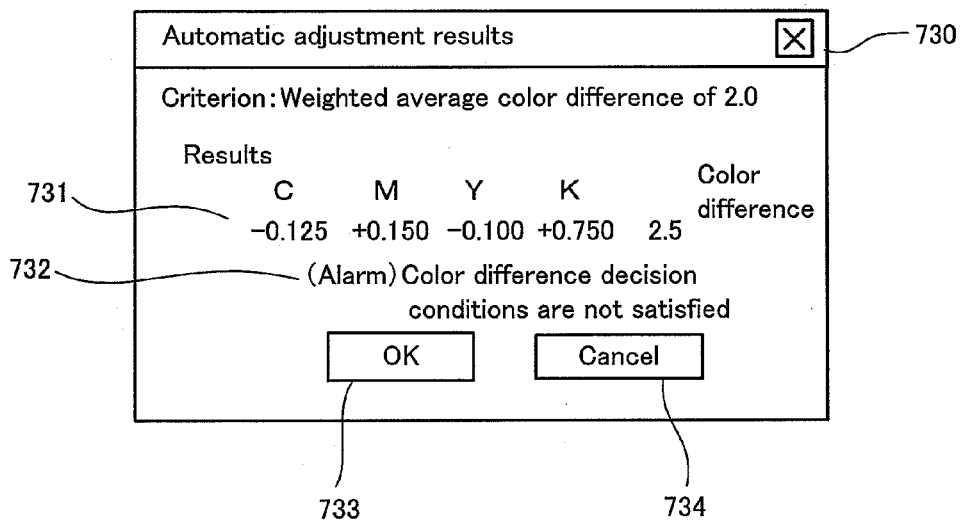

FIG. 11A shows a calculation result displaying screen 720 displayed when the initial print density has converged, and FIG. 11B shows a calculation result displaying screen 730 displayed when the initial print density does not converge and the number of the repetition of the processing reaches the predetermined maximum number of repetition.

The calculation result displaying screens 720 and 730 display result displaying sections 721 and 731 that display the initial print densities of the C, M, Y, and K colors and the color differences between target color and the print colors; OK buttons 722 and 733 that are used to fix the initial print densities displayed on the result displaying sections 721 and 731; and buttons 723 and 734 that are used to stop the setting the initial print densities. The calculation result displaying screen 730 shown in FIG. 11B also displays a warning message 732 of "a decision condition of the color difference is not satisfied".

If a user selects the OK buttons 722 and 733 by using the mouse 34, the initial print densities are transmitted from the density calculation section 260 shown in FIG. 4 to the density adjusting section 270.

The density adjusting section 270 forms an expected image of the print image, which is to be printed in the printing system 1, on the basis of the print image data and the print densities of the C, M, Y, and K color inks transmitted from the color forecasting section 250. Further, the density adjusting section 270 transmits the expected image to the image displaying section 290, and instructs the noticeable color setting screen 500 shown in FIG. 6 to be updated.

The image displaying section 290 replaces the print image 510, which is displayed on the noticeable color setting screen 500 shown in FIG. 6, with the expected image; displays previously set dot percentage of each noticeable color, a target color, priority, a forecasted print color, and the color difference between the target color and the print color on the color information displaying section 520; and displays the calculated initial print density of inks on the manual density adjusting section 530. A user changes a value on the manual density adjusting section 530 by using the mouse 34 in order to manually and finely adjust the initial print density of the inks. The image displaying section 290 corresponds to an example of a displaying section in the present invention.

Further, if a user selects the EXECUTE button 544 by using the mouse 34, the initial print density of the inks is transmitted from the density adjusting section 270 of FIG. 4 to the control device 10 and the print density of the inks of the printing machine 20 is set to the initial print density by the control device 10 (Step S8 of FIG. 5).

If the initial print density of the inks is set, test printing is repeated while the print density of the inks is finely adjusted in the control device 10 so that the calorimetric value obtained by the calorimeter 11 becomes suitable for the target color. When the print density of the inks is stabilized, a printing start signal is transmitted from the workstation 30 to the control device 10. Since the initial print density of the inks is set to a value approaching a target print density for achieving a target color in this embodiment, it is possible to shorten the time required until the stabilization of the print density of the inks and to suppress the occurrence of spoilage. Further, once the reference printing machine has undergone color matching, any other printing machines can easily reproduce a print color of the reference printing machine without requiring any skilled techniques, by acquiring a print density of the ink of the reference printing machine via the Internet line etc.

The first embodiment has been described so far, and a second embodiment of the present invention will be described. A second embodiment of the present invention has the same structure as the first embodiment shown in FIG. 4, but is different from the first embodiment only in terms of a method of setting a noticeable color in the noticeable color setting section 220. Accordingly, FIGS. 4, 6, and 7 are also used to describe this embodiment, and only the difference between the first and second embodiments will be described.

Also in this embodiment, if the region radio button 612 shown in FIG. 6 is selected so that a region including important colors is selected on the print images 510A, 510B of the noticeable color setting screen 500, the position information of the region is transmitted from the operation section 280 of FIG. 4 to the noticeable color setting section 220. In the noticeable color setting section 220 of this embodiment, several dot percentages representing all pixels in a region represented by the position information, which is transmitted from the operation section 280, of the print image data are analyzed. Accordingly, the total number of pixels having the same dot percentage is calculated. In addition, the dot percentage, which corresponds to the large calculated total number, is selected as a predetermined numeral (two in this embodiment), and the color represented by the selected dot percentage is set as a noticeable color. A color, which corresponds to high frequency of appearance, in the region is set as a noticeable color. For this reason, even though important colors are dispersed in the region, a user can easily set the important colors as noticeable colors.

Further, in the noticeable color setting section 220, a high priority order is given to the several set noticeable colors in descending order of the area of a portion, which includes the noticeable colors, on the print images 510A, 510B. In general, an important color frequently has a large area on the print image. Further, since a priority order is automatically given according to the area corresponding to each color, it is possible to obtain the preferred print image where an important color is represented as a target color even though a user does not have skilled knowledge about printing.

The second embodiment has been described so far, and a third embodiment of the present invention will be described. The third embodiment of the present invention has the same structure as the first embodiment shown in FIG. 4, but is different from the first embodiment only in terms of the processing in the color forecasting section 250 and the density calculation section 260. Accordingly, FIGS. 4 and 5 are also used to describe this embodiment, and only the difference between the first and third embodiments will be described.

Also in this embodiment, prior to printing, chart images are printed while a print density of the ink in the reference printing machine is set to the standard print density as well as a total of 16 chart images are printed while the print densities of the C, M, Y, and K color inks have been independently changed into −0.2, −0.1, +0.1, and +0.2 with respect to the standard print density, respectively. The print densities of the inks of the 16 chart images, the dot percentages of the patches of each chart image and the calorimetric values are transmitted from the reference printing machine to the workstation 30 and the corresponding relationship is stored in the storage section 201.

Next, also in the printing machine 20, chart images are printed while a print density of the inks is set to the standard print density as well as a total of 16 chart images are printed while the C, M, Y, and K colors are set to the changed states of "standard print density −0.2", "standard print density −0.1", "standard print density +0.1", and "standard print density +0.2", respectively. The colorimetry of the patches of the formed chart images is also performed. In addition to a color of each patch in the standard print density (referred to as a reference color), a corresponding relationship between a variation in the print density after the change with respect to the standard print density, and a difference in the print density after the change with respect to the reference color is stored in the storage section 201. In this embodiment, a standard profile where the density conversion values X, Y, and Z of colorimetric values of patches in the standard print densities C, M, Y, and K correspond to the input dot percentages C, M, Y, and K of patches, and a difference profile where the differences ΔX, ΔY, and ΔZ between the variations ΔC, ΔM, ΔY, and ΔK of the print densities and the patches correspond to the input dot percentages C, M, Y, and K of the patches, are stored. Since only the corresponding relationship, which is obtained by actually performing the colorimetry of each patch, is stored as described above, it is possible to reduce the required memory space.

When the printing is actually performed, like the first embodiment, a print density of the reference ink transmitted from the reference printing machine is acquired in the density acquisition section 230 (Step S1 of FIG. 5), a print image data is acquired in the image acquisition section 210 (Step S2 of FIG. 5), and a noticeable color in a print image represented by the print image data is set (Step S3 of FIG. 5). Then, by using the corresponding relationship between the dot percentages and the colorimetric value of each patch and the formula (1), a print color of the noticeable color in the reference printing machine is forecasted, the forecast print color is set as a target color of the noticeable color in the printing machine 20 (Step S4 of FIG. 5), a tentative print density of the inks in the printing machine 20 is determined, and a print color of the noticeable color in the tentative print density of the inks is forecasted (Step S5 of FIG. 5), and a color difference between the forecasted print color and the target color is determined (Step S6 of FIG. 5). The change of the tentative print density of the inks in the printing machine 20 (Step S7 of FIG. 5), the forecast of the print color of the noticeable color in a new tentative print density of the inks (Step S5 of FIG. 5), and the decision of the color difference (Step S6 of FIG. 5) are repeated until the color difference of the decision subject converges below the reference color difference (No in Step S6 of FIG. 5). In this embodiment, the print density of the inks for achieving a target color in the printing machine 20 is calculated, and the forecasted print density is set to the tentative print density of the inks in an initial state, so that the processing time required until the color difference converges below the reference color difference is shortened.

Figure 12:
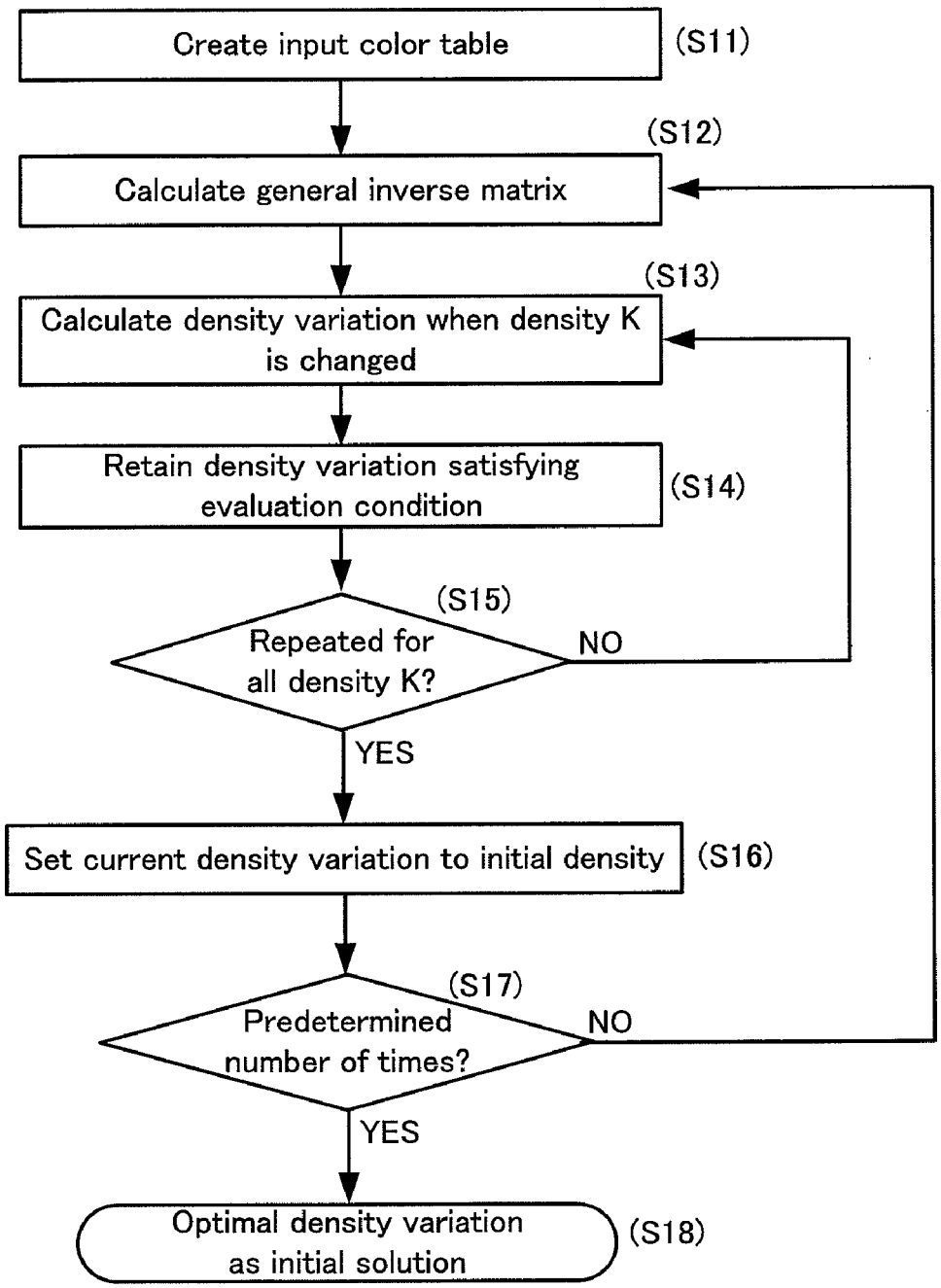
FIG. 12 is a flow chart illustrating a series of processing for calculating the print density of an ink.

FIG. 12 is a flow chart illustrating a series of processing for calculating the print density of an ink.

First, at the color forecasting section 250, only portions, which are close to the input C, M, Y, and K values of the noticeable colors where the input dot percentages C, M, Y, and K of the patches are set, are extracted from the standard profile and the difference profile of the printing machine 20 stored in the storage section 201. Subsequently, interpolation processing is performed, so that a table representing a corresponding relationship between the variations ΔC, ΔM, ΔY, and ΔK of the print densities of the noticeable colors and the differences ΔX, ΔY, and ΔZ with respect to a reference color is created (Step S11 of FIG. 12).

Figure 13:
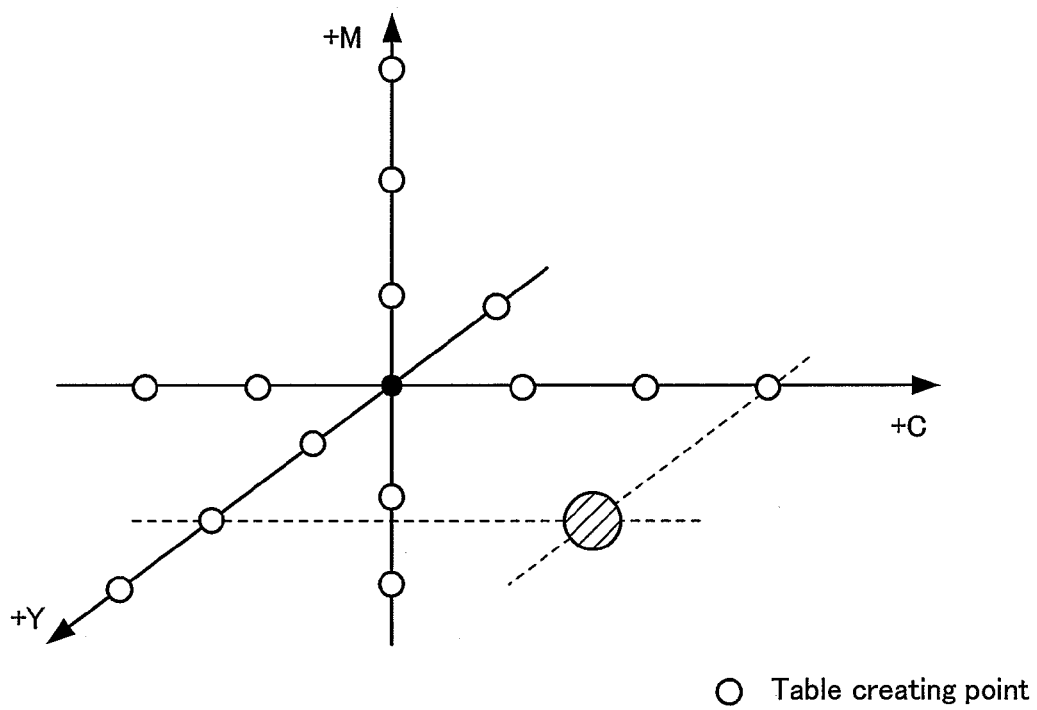
FIG. 13 is a conceptual diagram of a made table.

FIG. 13 is a conceptual diagram of the created table.

Axes shown in FIG. 13 indicate the variations of the print densities of the C, M, Y, and K color inks with respect to the standard print density. A central point plotted by a black circle indicates the standard print density, and the value of the central point indicates the print color of the noticeable color (reference color) while the print densities of the inks are set to the standard print density. Further, each of points plotted by a white circle indicates a print density when the print densities of the C, M, Y, and K color inks have been independently changed with respect to the standard print densities, respectively. The values of the points indicate differences between the print colors of the noticeable colors and the standard colors while the print densities of the inks are set to the print densities represented by the points. For example, a print color of a noticeable color in the print density of the inks, which is indicated by a point plotted by a hatched circle, can be calculated by substituting the values of each of the points, which are plotted by the black circle and the white circle, in Expression (1). Additionally, if the spacing of print densities is rough when the print densities of the C, M, Y, and K color inks have been independently changed with respect to the standard print densities, it is possible to create a table by performing interpolation processing on the print densities of the inks, as in the first embodiment, so that variations of the print densities of the inks become fine.

Herein, in Expression (1), a difference between two forecasted print colors R1 and R2 is represented by the total sum of differences between the colorimetric values of the patches in the standard print densities and the colorimetric values of the patches in the changed print densities of the inks with respect to the variations of the print densities of the C, M, Y, and K color inks, and is represented by $$R1 - R2 = \Sigma(R1_{Color} - R2_{Color}) \qquad (1\_1)$$

If the calorimetric values (L*, a*, and b*) are represented by colorimetric density values (−log(X), −log(Y), and −log(Z)), a corresponding relationship between the variations Dc, Dm, Dy, and Dk of the print densities of the inks, which are represented by the table of FIG. 13, with respect to the standard print densities, and the differences Δ−log(X), Δ−log(Y), and Δ−log(Z) between the print calorimetric densities of the noticeable colors in the standard print densities and the print calorimetric densities of the noticeable colors in the changed print densities is represented by the following determinant (2).

[Equation 1]
$$\begin{pmatrix} \Delta - \log X \\ \Delta - \log Y \\ \Delta - \log Z \end{pmatrix} = \begin{pmatrix} \frac{\partial -\log X}{\partial D_c} & \frac{\partial -\log X}{\partial D_m} & \frac{\partial -\log X}{\partial D_y} & \frac{\partial -\log X}{\partial D_k} \\ \frac{\partial -\log Y}{\partial D_c} & \frac{\partial -\log Y}{\partial D_m} & \frac{\partial -\log Y}{\partial D_y} & \frac{\partial -\log Y}{\partial D_k} \\ \frac{\partial -\log Z}{\partial D_c} & \frac{\partial -\log Z}{\partial D_m} & \frac{\partial -\log Z}{\partial D_y} & \frac{\partial -\log Z}{\partial D_k} \end{pmatrix} \begin{pmatrix} D_c \\ D_m \\ D_y \\ D_k \end{pmatrix} \cdots$$

Further, Expression (2) is represented as $$X = JD \qquad \text{Expression } (2\_1)$$

If the differences Δ−log(X), Δ−log(Y), and Δ−log(Z) between the print colorimetric densities of the noticeable colors in actual standard print densities and the colorimetric density values of the target colors of the noticeable colors are substituted with the left term X, solutions D become the density differences between the print densities of the inks for achieving the target colors and the standard print densities. However, since D corresponds to three dimensions and X corresponds to four dimensions, there is no inverse matrix J⁻ that is used to obtain a unique solution satisfying D=J⁻X. For this reason, the following two conditions are added to obtain a generalized inverse matrix J⁺, and an approximate solution D' approaching the exact solution D is uniquely determined by the following determinant.

$$D' = J^+ X \qquad \text{Expression (2\_2)}$$

(Condition 1) Since the approximate solution D' is different from the exact solution D, "JD'≠X" is satisfied and an error e (=JD'−X) is generated. The variation D' of the print density where the square of the error e becomes minimum is calculated. (Least squares solution)

(Condition 2) The variation D of the print density is a difference with a standard print density. Accordingly, if the variation D is as small as possible, the stability of the printing machine is improved after adjustment. For this reason, the variation D of which the absolute value becomes minimum is calculated. (Norm minimal solution)

The distribution of the spectral densities of C, M, and Y colors and a function in the same color of X, Y, and Z colors are mainly in corresponding relationships between C and X, between M and Y, and between Y and Z. For example, if Dc of Determinant (2) is changed, Δ−log(X) is significantly changed. However, if the print density of K color is changed, all of the calorimetric density values X, Y, and Z are changed. For this reason, even when only the print density Dk of the K color ink is changed, the print densities Dc, Dm, and Dy of the C, M, and Y color inks are changed in the solution D' calculated under the norm minimal condition. As a result, the K color is not particularly changed.

Determinant (3) is a determinant that is obtained by transposing a Dk component representing the variation of the K color to the left side in Determinant (2).

$$\begin{pmatrix} \Delta - \log X - \frac{\partial -\log X}{\partial D_k} D_k \\ \Delta - \log Y - \frac{\partial -\log Y}{\partial D_k} D_k \\ \Delta - \log Z - \frac{\partial -\log Z}{\partial D_k} D_k \end{pmatrix} = J \begin{pmatrix} D_c \\ D_m \\ D_y \end{pmatrix}, \qquad \text{[Equation 2]}$$

$$J = \begin{pmatrix} \frac{\partial -\log X}{\partial D_c} & \frac{\partial -\log X}{\partial D_m} & \frac{\partial -\log X}{\partial D_y} \\ \frac{\partial -\log Y}{\partial D_c} & \frac{\partial -\log Y}{\partial D_m} & \frac{\partial -\log Y}{\partial D_y} \\ \frac{\partial -\log Z}{\partial D_c} & \frac{\partial -\log Z}{\partial D_m} & \frac{\partial -\log Z}{\partial D_y} \end{pmatrix}$$

Dk component, which relates to the K color, of Determinant (2) is separated and Dk component is set to "0". The approximate solution D' is calculated under a condition that only C, M, and Y colors are changed and the K color is individually adjusted, so that it is possible to improve the solution accuracy.

Further, if several noticeable colors and the target colors of the several noticeable colors are set, Expression (2_1) has Xn "color differences_n between noticeable colors_n in the standard print densities and the colorimetric density values of the target colors_n" for each of the several noticeable colors. However, since the print density of the inks set in one time printing has one value, the calculated solution D' "the density difference between the print density n for achieving the target color n and the standard print density" has one value for the noticeable color and the target color. Assuming that the weight added to each of Xn is represented by Wn, several simultaneous equations expressed as Expression (4) are made.

$$\begin{cases} W_1 X_1 = W_1 J_1 D \\ W_2 X_2 = W_2 J_2 D \\ \quad \vdots \\ W_n X_n = W_n J_n D \end{cases} \qquad \text{[Equation 3]}$$

The weight Wn of each color is a diagonal matrix where diagonal components are the same. If Expression (4) is represented by a determinant, the following expression is obtained.

$$W \begin{pmatrix} X_1 \\ X_2 \\ \vdots \\ X_n \end{pmatrix} = W J \begin{pmatrix} D_c \\ D_m \\ D_y \end{pmatrix}, \qquad \text{[Equation 4]}$$

$$J = \begin{pmatrix} J_1 \\ J_2 \\ \vdots \\ J_n \end{pmatrix},$$

$$W = \begin{pmatrix} W_1 & & & \\ & W_2 & & \\ & & \ddots & \\ & & & W_n \end{pmatrix}$$

Simultaneous equations representing a corresponding relationship for each of the several target colors are made and the print density common to the target colors is calculated. Accordingly, even if several target colors are set, it is possible to efficiently calculate the print densities that represent the target colors.

The conditions are added and a Moore-Penrose type generalized inverse matrix J+ is calculated. An approximate solution D' of a solution D, which represents the variations of the print densities of the inks for achieving the target colors with respect to the standard print densities, is obtained (Step S12 of FIG. 12).

Subsequently, the approximate solution D' calculated by Expression (2_2) is substituted in the solution D of Expression (2_1). Therefore, while the print densities of the ink are changed from the standard print densities by variations D', print colors X' when the noticeable colors are printed are calculated. The calculated print colors X' are transmitted to the density calculation section 260.

In addition, at the density calculation section 260, differences between the calculated print colors X' and the target colors X are calculated (Step S13 of FIG. 12), and a mean color difference of these differences is obtained.

At this point, if the calculated mean color difference is smaller than the existing mean color difference, the variations D' (Dk, Dc, Dm, and Dy) and a mean color difference are stored (Step S14 of FIG. 12). In this embodiment, an example is shown for storing the variation D' when the mean color difference becomes the smallest. However, it is also possible in the evaluation condition in step S14 to store the variations D' when the maximum color difference of the noticeable color becomes the smallest.

Subsequently, the variation Dk of the density of the K color ink is changed (Step S15 of FIG. 12), the calculation of the differences between the print colors X' and the target colors X (Step S13 of FIG. 12), and the storage of the variations D' (Dk, Dc, Dm, and Dy) and the mean color difference (Step S14 of FIG. 12) are performed. In this embodiment, the variation Dk of the K color ink is changed in the range of "−0.15 to +0.15" by every variation step of 0.025, and the processing of Steps S13 to S15 are repeated.

If the processing of all steps is terminated (Yes in Step S15 of FIG. 12), the variations D' (Dk, Dc, Dm, and Dy) stored at the present time are set as initial solutions (Step S16 of FIG. 12).

Further, the variations D' (Dk, Dc, Dm, and Dy) set as the initial solutions are substituted in Expression (2_1) until the number of the repetition reaches the predetermined number of times (Step S17 of FIG. 12), so that a new general matrix J+ is calculated (Step S12 of FIG. 12). In addition, the processing of Steps S13 to S16 is performed, so that the update of the initial solutions is repeated.

If the number of the repetition reaches a predetermined number of times (Yes in Step S17 of FIG. 12), the initial solution set at that time is determined as the tentative print density of the ink in the Step S6 of FIG. 5 (Step S18 of FIG. 12).

Subsequently, while the print densities of several color inks are changed with starting from the determined tentative print density of the inks, the print density when the target color is achieved is searched for.

Figure 14:
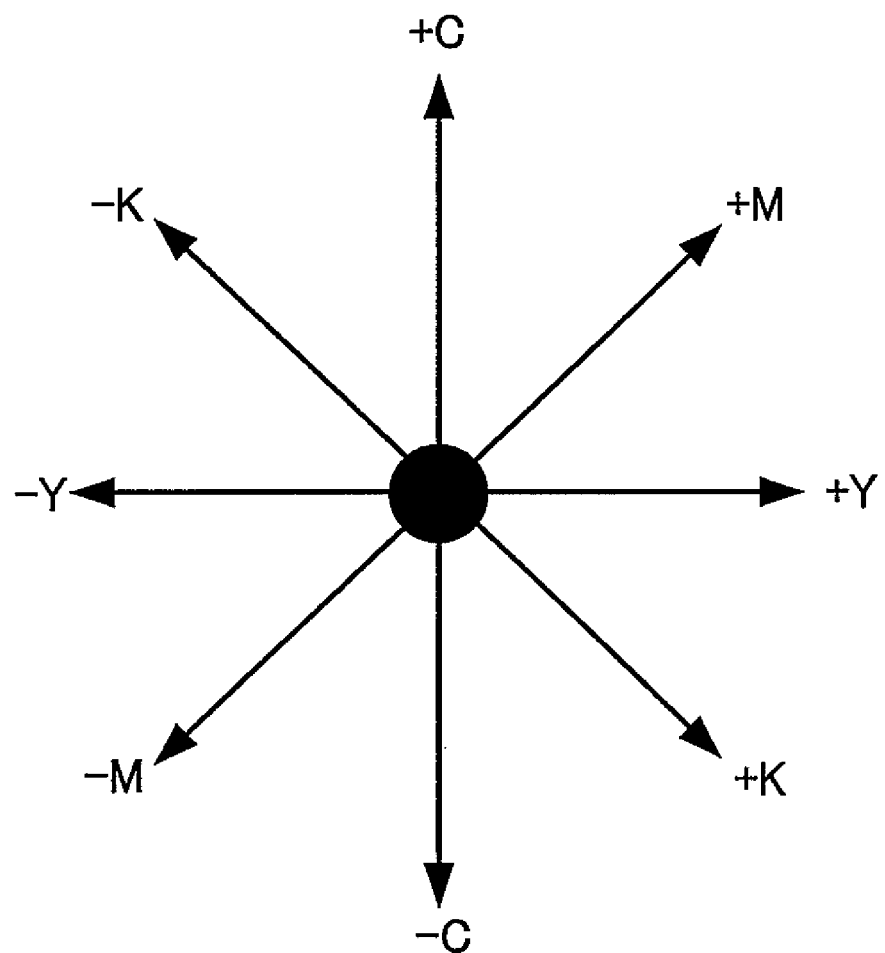
FIG. 14 is a view showing a relationship between the tentative print density of an ink and a search direction.

FIG. 14 is a view showing a relationship between the print density of the tentative ink and a search direction.

In this embodiment, while the print densities of the C, M, Y, and K color inks are changed by every 0.025 with starting from the tentative print density of the inks shown by a black circle, searching is performed.

Figure 15:
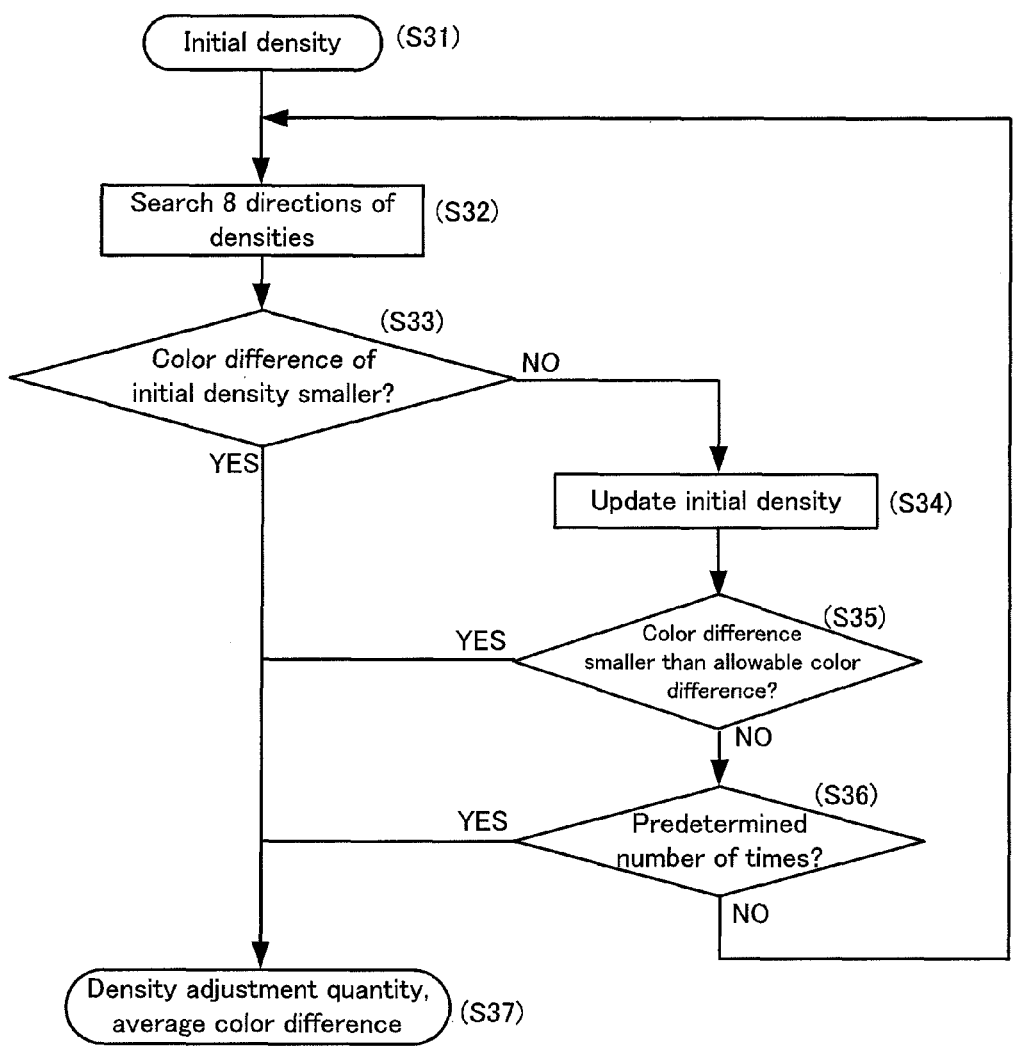
FIG. 15 is a flowchart illustrating a series of processing for searching the print density when a target color is achieved with starting from the tentative print density of an ink.

FIG. 15 is a flowchart illustrating a series of processing for searching for the print density when a target color is achieved with starting from the tentative print density of the inks.

First, each of the print densities of the C, M, Y, and K color inks is changed by every 0.025 with starting from the tentative print density of the inks, so that all of eight print densities are set (Step S31 of FIG. 15). Subsequently, the differences between the print densities and the standard print densities are substituted in Expression (2_1), so that the print colors of the noticeable colors in the print densities are obtained and the mean color difference between the print colors and the target colors is calculated (Step S32 of FIG. 15).

If the calculated mean color difference is smaller than the mean color difference in the tentative print density of the inks (No in Step S33 of FIG. 15), a variation is added to the tentative print density of the inks, the print density for achieving the minimum mean color difference is set to a new print density of the inks (Step S34 of FIG. 15). In addition, if the mean color difference at the present time is smaller than a previously set allowable color difference (Yes in Step S35 of FIG. 15), the tentative print density of the inks at the present time is determined as a final print density of the inks where a target color is achieved (Step S37 of FIG. 15).

Further, if the minimum mean color difference at the present time is equal to or larger than the allowable color difference (No in Step S35 of FIG. 15), the mean color difference between a target color and the print color of the print density on the peripheral portion with starting from a new tentative print density of the inks is calculated (Step S32 of FIG. 15). until the number of the repetition reaches a predetermined number of times (Step S36 of FIG. 15) or the mean color difference becomes smaller than the allowable color difference (Step S35 of FIG. 15). The comparison of the mean color difference (No in Step S33 of FIG. 15) and the update of the tentative print density of the inks (Steps S34 of FIG. 15) are repeated.

In FIG. 15, as a print density to realize the target color, an example is shown for searching a print density when the mean color difference between the print color and the target color becomes the smallest. However, it is also possible to search a print density when the maximum color difference of the noticeable color becomes the smallest.

The forecasted print density of the inks where a target color is achieved is calculated using a generalized inverse matrix $J^+$ as described above, and a final print density is searched for with starting from the forecasted print density. Therefore, it is possible to reduce a problem corresponding to a local solution, and to shorten processing time.

The print densities of four C, M, Y, and K color inks have been set in the above description. However, for example, the print densities of not only four C, M, Y, and K color inks but also inks of specific colors may be obtained in the present invention.

Although in the above examples, inks are used as color materials, the color materials of the present invention may be toner for printing digital photographs.

What is claimed is:

1. A density calculating apparatus comprising:
an image data acquisition section that acquires print image data representing a print image to be printed by a first printing system, the first printing system setting print densities of color materials having a plurality of colors and printing an image based on the image data by using the color materials in the print densities;
a density acquisition section that acquires the print densities in a second printing system different from the first printing system, the second printing system setting print densities of the color materials having the plurality of colors and printing an image based on the image data by using the color materials in the print densities;
a place designating section that designates a place on the print image represented by the print image data acquired by the image data acquisition section;
a first color guess section that guesses a print color to be printed by the first printing system on the basis of the print densities of the color materials having the plurality of colors and the image data;
a second color guess section that guesses a print color to be printed by the second printing system on the basis of the print densities of the color materials having the plurality of colors and the image data;
a target color acquisition section that acquires a print color of the place designated by the place designating section as a target color of the place in the first printing system, by providing the print image data acquired by the image data acquisition section and the print densities acquired by the density acquisition section to the second color guess section;
a density calculation section that calculates the print densities of the color materials having the plurality of colors by using the first color guess section so that the target color acquired by the target color acquisition section is achieved at the place by the first printing system based on the print image data; and a storage section that stores a reference color of each patch which is obtained by printing the chart image while setting the print density of the first printing system to a standard print density when a print color of an image to be printed on the basis of a predetermined image data becomes a predetermined standard color, as well as stores a corresponding relationship between a color difference and a density difference, the color difference being a difference between the reference color and a color of each patch obtained by printing the chart image while setting the print density of the first printing system to a series of print densities changed from the standard print density for each of the color materials having the plurality of colors, and the density difference being a difference between the print density and the standard print density, wherein the first color guess section receives the designation of a tentative print density of each of the color materials having the plurality of colors and the place, acquires a relating portion according to the place of the corresponding relationship stored in the storage section, and guesses a print color at the place by performing interpolation processing which uses the reference color of each patch and the relating portion, wherein the interpolation processing includes calculation according to:

print color R of a patch approximately obtained as follows:

$$R=R(std)+R\Delta C+R\Delta M+R\Delta Y+R\Delta K \quad (1)$$

wherein R(std) is print color of the standard print density, a difference between the colorimetric value of the patch when print density of only C color ink is changed and the colorimetric value of the patch printed with the standard print density is $R_{\Delta C}$, a difference between the colorimetric value of the patch when the print density of only M color ink is changed and the colorimetric value of the patch printed with the standard print density is $R_{\Delta M}$, a difference between the colorimetric value of the patch when the print density of only Y color ink is changed and the colorimetric value of the patch printed with the standard print density is $R_{\Delta Y}$, and a difference between the colorimetric value of the patch when the print density of only K color ink is changed and the colorimetric value of the patch printed with the standard print density is $R_{\Delta K}$.

2. The density calculating apparatus according to claim 1, wherein the place designating section designates a plurality of places as the place while giving different priority orders to the places, the target color acquisition section acquires target colors of the plurality of places, and the density calculation section calculates common print densities where the target colors of the plurality of places are achieved by the printing system, while emphasizing the achievement accuracy of the place, which has a relatively high priority order, of the plurality of places as compared to the achievement accuracy of the place that has a relatively low priority order.

3. The density calculating apparatus according to claim 1, wherein the place designating section displays the print image on the basis of the print image data, and designates the place according to a selection operation for selecting the place on the displayed print image.

4. The density calculating apparatus according to claim 1, wherein the place designating section designates a region on the print image, and the target color acquisition section acquires a target color with respect to a mean color of the region.

5. The density calculating apparatus according to claim 1, wherein the place designating section designates a region on the print image, and the target color acquisition section acquires a target color for a color that most frequently appears in the region.

6. The density calculating apparatus according to claim 1, wherein the print image data is formed of a group of color data that represents colors of points on the print image, and the place designating section designates one or more point groups of which the number is large among point groups including points on the print image where the color data are common, as the place.

7. The density calculating apparatus according to claim 1, wherein the print image data is formed of groups of color data that represents colors of points on the print image, and the place designating section designates each point, of which the color is represented by the same color data as those representing a predetermined important color, on the print image as the place.

8. The density calculating apparatus according to claim 2, wherein the place designating section gives a priority order to the plurality of places in descending order of the area of the place.

9. The density calculating apparatus according to claim 1, wherein at least either the first color guess section or the second color guess section estimates a print color at the place, on the basis of a corresponding relationship between a color of each patch and a print density as well as on the basis of a tentative print density specified for each of the color materials having a plurality of colors, the corresponding relationship being obtained by printing a chart image in the second printing system, based on chart image data representing the chart image in which patches of a plurality of colors are arranged, while changing the print density to a series of print densities for each of the color materials having the plurality of colors, such that the estimated print color at the place is obtained based on the print image data and the tentative print density.

10. The density calculating apparatus according to claim 1, further comprising:

a displaying section that displays a forecast image of a print image to be printed by the first printing system on the basis of the print image data and the print densities of the color materials having the plurality of colors, the print densities being calculated by the density calculation section.

11. The density calculating apparatus according to claim 1, wherein the density calculation section uniquely gives a solution x', which satisfies norm minimal solution and a least squares solution, of an exact solution obtained by solving a determinant Ax=y (wherein, A is a matrix, x is a vector representing a density difference, and y is a vector representing a difference of a print color), which is stored in the storage section and corresponds to the corresponding relationship, with respect to x' to a determinant x'=A'y; obtains a solution of a density difference by substituting a difference between the target color and the color of the place with y of the determinant x'=A'y by using a generalized inverse matrix A' of the matrix A; repeats the designation of the tentative print density for the first color guess section and the receiving of the print color guessed by the first color guess section with starting from a density, which is deviated from the standard density by the obtained density difference, as the tentative print density; and searches for a print density where the target color is achieved as a print color at the place.

12. The density calculating apparatus according to claim 11,
wherein when a plurality of target colors of the plurality of places is acquired in the target color acquisition section, the density calculation section makes simultaneous equations by substituting y of determinant x'=A'y with the difference between the color of each place and a target color of the place, a solution of the density difference common to the plurality of target colors is obtained by solving the simultaneous equations, and a print density where the plurality of target colors is achieved as print colors at the plurality of places is searched for with starting from a density, which is deviated from the standard density by the obtained density difference, as the tentative print density.

13. A density setting apparatus comprising:
an image data acquisition section that acquires print image data representing a print image to be printed by a first printing system, the first printing system setting print densities of color materials having a plurality of colors and printing an image based on the image data by using the color materials in the print densities;
a density acquisition section that acquires the print densities in a second printing system different from the first printing system, the second printing system setting print densities of color materials having a plurality of colors and printing an image based on the image data by using the color materials in the print densities;
a place designating section that designates a place on the print image represented by the print image data acquired by the image data acquisition section;
a first color guess section that guesses a print color to be printed by the first printing system on the basis of the print densities of the color materials having the plurality of colors and the image data;
a second color guess section that guesses a print color to be printed by the second printing system on the basis of the print densities of the color materials having the plurality of colors and the image data;
a target color acquisition section that acquires a print color of the place designated by the place designating section as a target color of the place in the first printing system, by providing the print image data acquired by the image data acquisition section and the print densities acquired by the density acquisition section to the second color guess section;
a density calculation section that calculates the print densities of the color materials having the plurality of colors by using the first color guess section so that the target color acquired by the target color acquisition section is achieved at the place by the first printing system based on the print image data; and
a density setting section that sets the print densities of the color materials having the plurality of colors in the first printing system, the print densities being calculated by the density calculation section; and
a storage section that stores a reference color of each patch which is obtained by printing the chart image while setting the print density of the first printing system to a standard print density when a print color of an image to be printed on the basis of a predetermined image data becomes a predetermined standard color, as well as stores a corresponding relationship between a color difference and a density difference, the color difference being a difference between the reference color and a color of each patch obtained by printing the chart image while setting the print density of the first printing system to a series of print densities changed from the standard print density for each of the color materials having the plurality of colors, and the density difference being a difference between the print density and the standard print density,
wherein the first color guess section receives the designation of a tentative print density of each of the color materials having the plurality of colors and the place, acquires a relating portion according to the place of the corresponding relationship stored in the storage section, and guesses a print color at the place by performing interpolation processing which uses the reference color of each patch and the relating portion,
wherein the interpolation processing includes calculation according to:
print color R of a patch approximately obtained as follows:

$$R=R(std)+R\Delta C+R\Delta M+R\Delta Y+R\Delta K \quad (1)$$

wherein R(std) is print color of the standard print density, a difference between the colorimetric value of the patch when print density of only C color ink is changed and the colorimetric value of the patch printed with the standard print density is $R_{\Delta C}$, a difference between the colorimetric value of the patch when the print density of only M color ink is changed and the colorimetric value of the patch printed with the standard print density is $R_{\Delta M}$, a difference between the colorimetric value of the patch when the print density of only Y color ink is changed and the colorimetric value of the patch printed with the standard print density is $R_{\Delta Y}$, and a difference between the colorimetric value of the patch when the print density of only K color ink is changed and the colorimetric value of the patch printed with the standard print density is $R_{\Delta K}$.

14. A non-transitory computer-readable medium that stores a density calculating program executed in a computer, on the computer, the density calculating program building:
an image data acquisition section that acquires print image data representing a print image to be printed by a first printing system, the first printing system setting print densities of color materials having a plurality of colors and printing an image based on the image data by using the color materials in the print densities;
a density acquisition section that acquires the print densities in a second printing system different from the first printing system, the second printing system setting print densities of color materials having a plurality of colors and printing an image based on the image data by using the color materials in the print densities;
a place designating section that designates a place on the print image represented by the print image data acquired by the image data acquisition section;
a first color guess section that guesses a print color to be printed by the first printing system on the basis of the print densities of the color materials having the plurality of colors and the image data;
a second color guess section that guesses a print color to be printed by the second printing system on the basis of the print densities of the color materials having the plurality of colors and the image data;
a target color acquisition section that acquires a print color of the place designated by the place designating section as a target color of the place in the first printing system, by providing the print image data acquired by the image data acquisition section and the print densities acquired by the density acquisition section to the second color guess section;

a density calculation section that calculates the print densities of the color materials having the plurality of colors by using the first color guess section so that the target color acquired by the target color acquisition section is achieved at the place by the first printing system based on the print image data and a storage section that stores a reference color of each patch which is obtained by printing the chart image while setting the print density of the first printing system to a standard print density when a print color of an image to be printed on the basis of a predetermined image data becomes a predetermined standard color, as well as stores a corresponding relationship between a color difference and a density difference, the color difference being a difference between the reference color and a color of each patch obtained by printing the chart image while setting the print density of the first printing system to a series of print densities changed from the standard print density for each of the color materials having the plurality of colors, and the density difference being a difference between the print density and the standard print density, wherein the first color guess section receives the designation of a tentative print density of each of the color materials having the plurality of colors and the place, acquires a relating portion according to the place of the corresponding relationship stored in the storage section, and guesses a print color at the place by performing interpolation processing which uses the reference color of each patch and the relating portion, wherein the interpolation processing includes calculation according to:

print color R of a patch approximately obtained as follows:

$$R=R(std)+R\Delta C+R\Delta M+R\Delta Y+R\Delta K \quad (1)$$

wherein R(std) is print color of the standard print density, a difference between the colorimetric value of the patch when print density of only C color ink is changed and the colorimetric value of the patch printed with the standard print density is $R_{\Delta C}$, a difference between the colorimetric value of the patch when the print density of only M color ink is changed and the colorimetric value of the patch printed with the standard print density is $R_{\Delta M}$, a difference between the colorimetric value of the patch when the print is changed and the colorimetric value of the patch printed with the standard print density is $R_{\Delta Y}$, and a difference between the colorimetric value of the patch when the print density of only K color ink is changed and the colorimetric value of the patch printed with the standard print density is $R_{\Delta K}$.

15. A non-transitory computer-readable medium that stores a density setting program executed in a computer, on the computer, the density calculating program building:

an image data acquisition section that acquires print image data representing a print image to be printed by a first printing system, the first printing system setting print densities of color materials having a plurality of colors and printing an image based on the image data by using the color materials in the print densities;

a density acquisition section that acquires the print densities in a second printing system different from the first printing system, the second printing system setting print densities of color materials having a plurality of colors and printing an image based on the image data by using the color materials in the print densities;

a place designating section that designates a place on the print image represented by the print image data acquired by the image data acquisition section;

a first color guess section that guesses a print color to be printed by the first printing system on the basis of the print densities of the color materials having the plurality of colors and the image data;

a second color guess section that guesses a print color to be printed by the second printing system on the basis of the print densities of the color materials having the plurality of colors and the image data;

a target color acquisition section that acquires a print color of the place designated by the place designating section as a target color of the place in the first printing system, by providing the print image data acquired by the image data acquisition section and the print densities acquired by the density acquisition section to the second color guess section;

a density calculation section that calculates the print densities of the color materials having the plurality of colors by using the first color guess section so that the target color acquired by the target color acquisition section is achieved at the place by the first printing system based on the print image data; and a density setting section that sets the print densities of the color materials having the plurality of colors in the first printing system, the print densities being calculated by the density calculation section; and a storage section that stores a reference color of each patch which is obtained by printing the chart image while setting the print density of the first printing system to a standard print density when a print color of an image to be printed on the basis of a predetermined image data becomes a predetermined standard color, as well as stores a corresponding relationship between a color difference and a density difference, the color difference being a difference between the reference color and a color of each patch obtained by printing the chart image while setting the print density of the first printing system to a series of print densities changed from the standard print density for each of the color materials having the plurality of colors, and the density difference being a difference between the print density and the standard print density, wherein the first color guess section receives the designation of a tentative print density of each of the color materials having the plurality of colors and the place, acquires a relating portion according to the place of the corresponding relationship stored in the storage section, and guesses a print color at the place by performing interpolation processing which uses the reference color of each patch and the relating portion, wherein the interpolation processing includes calculation according to:

print color R of a patch approximately obtained as follows:

$$R=R(std)+R\Delta C+R\Delta M+R\Delta Y+R\Delta K \quad (1)$$

wherein R(std) is print color of the standard print density, a difference between the colorimetric value of the patch when print density of only C color ink is changed and the colorimetric value of the patch printed with the standard print density is $R_{\Delta C}$, a difference between the colorimetric value of the patch when the print density of only M color ink is changed and the colorimetric value of the patch printed with the standard print density is $R_{\Delta M}$, a difference between the colorimetric value of the patch when the print density of only Y color ink is changed and the colorimetric value of the patch printed with the standard print density is $R_{\Delta Y}$, and a difference between the colorimetric value of the patch when the print density of only K color ink is changed and the colorimetric value of the patch printed with the standard print density is R.

16. The apparatus of claim 1, wherein the interpolation processing further calculates minute variation of print densities in printing materials and further calculates dot percentages between dot percentages of the patches.

* * * * *